United States Patent
Ebi

(10) Patent No.: US 9,635,330 B2
(45) Date of Patent: Apr. 25, 2017

(54) IMAGE PROCESSING DEVICE, IMAGE PROCESSING METHOD, AND PROGRAM

(71) Applicant: SONY CORPORATION, Tokyo (JP)

(72) Inventor: Hiroaki Ebi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/661,241

(22) Filed: Mar. 18, 2015

(65) Prior Publication Data

US 2015/0279007 A1    Oct. 1, 2015

(30) Foreign Application Priority Data

Mar. 26, 2014  (JP) .................. 2014-063524

(51) Int. Cl.
G06K 9/00    (2006.01)
H04N 9/64    (2006.01)

(52) U.S. Cl.
CPC .................. *H04N 9/646* (2013.01)

(58) Field of Classification Search
CPC  H04N 1/60; H04N 9/045; H04N 9/68; H04N 9/646; G06T 5/002; G06T 2207/10024; G06T 2207/20012
USPC ............. 382/167, 264, 266; 348/222.1, 665, 348/E05.031
See application file for complete search history.

(56) References Cited

U.S. PATENT DOCUMENTS

| | | | | |
|---|---|---|---|---|
| 6,885,775 B2* | 4/2005 | Kondo | .................... | G06T 5/002 348/607 |
| 7,565,007 B2* | 7/2009 | Ishiga | .................... | H04N 9/045 382/162 |
| 7,576,891 B2* | 8/2009 | Hwang | .................... | H04N 1/58 358/1.9 |
| 8,031,935 B2* | 10/2011 | Shiraishi | .................. | H04N 1/58 348/241 |
| 2004/0263887 A1* | 12/2004 | Kotani | .................... | H04N 1/56 358/1.9 |
| 2005/0001907 A1* | 1/2005 | Hoshuyama | ............. | H04N 1/60 348/222.1 |
| 2006/0291746 A1* | 12/2006 | Kang | .................... | H04N 9/045 382/275 |
| 2007/0147697 A1* | 6/2007 | Lee | .......................... | H04N 5/21 382/260 |
| 2009/0021647 A1* | 1/2009 | Choi | ........................ | H04N 9/73 348/655 |
| 2010/0183240 A1 | 7/2010 | Hiraga et al. | | |
| 2010/0231740 A1* | 9/2010 | Matsushita | ............ | H04N 9/045 348/222.1 |
| 2013/0114896 A1* | 5/2013 | Matsumoto | ............. | G06T 5/002 382/167 |

FOREIGN PATENT DOCUMENTS

JP    2006-014024 A    1/2006

\* cited by examiner

*Primary Examiner* — Mekonen Bekele
(74) *Attorney, Agent, or Firm* — Chip Law Group

(57) ABSTRACT

There is provided an image processing device including a color determination unit configured to detect a region in a certain color from an input image, a feature amount calculating unit configured to calculate a feature amount related to luminance of the input image, and a noise reduction unit configured to perform noise removal on the input image on the basis of a result obtained by detecting the region in the certain color, and the feature amount.

12 Claims, 16 Drawing Sheets

FIG. 8

|  | F<Th1 | F≥Th1 |
|---|---|---|
| B<Th2 | SW1: CONNECTED<br>SW2: CONNECTED | SW1: CONNECTED<br>SW2: DISCONNECTED |
| B≥Th2 | SW1: DISCONNECTED<br>SW2: CONNECTED | SW1: DISCONNECTED<br>SW2: CONNECTED |

FIG. 13

| F<Th1 | F≥Th1 |
|---|---|
| SW1: DISCONNECTED<br>SW2: CONNECTED | SW1: CONNECTED<br>SW2: CONNECTED |

IMAGE PROCESSING DEVICE, IMAGE PROCESSING METHOD, AND PROGRAM

CROSS REFERENCE TO RELATED APPLICATIONS

This application claims the benefit of Japanese Priority Patent Application JP 2014-063524 filed Mar. 26, 2014, the entire contents of which are incorporated herein by reference.

BACKGROUND

The present disclosure relates to an image processing device, an image processing method, and a program. More particularly, the present disclosure relates to an image processing device, an image processing method, and a program that can acquire an image having better image quality. The technology has been traditionally known that performs a noise removal process on images to acquire an image having better image quality. To acquire an image having better image quality through a noise removal process, it is necessary to prevent image quality process from degrading, and efficiently remove noise in a noise removal.

For example, a technique (see, for example, JP 2010-213086A (corresponding to US 2010/0231740)) of weakening a noise removal effect in a color region on an image in which resolution degradation easily occurs has been developed as a technique related to a noise removal process.

SUMMARY

Although the above-described technique can certainly prevent resolution degradation, which namely means that the above-described technique can prevent image quality from degrading, it is still difficult to sufficiently remove noise because the technique weakens a noise removal effect. For example, the above-described technique is incapable of removing noise covering a wide range on an image, or low-frequency noise, so that it is difficult to acquire an image having sufficiently satisfactory image quality.

In view of such circumstances, the present technology has been developed to allow a user to acquire an image having better image quality.

According to an embodiment of the present disclosure, there is provided an image processing device including a color determination unit configured to detect a region in a certain color from an input image, a feature amount calculating unit configured to calculate a feature amount related to luminance of the input image, and a noise reduction unit configured to perform noise removal on the input image on the basis of a result obtained by detecting the region in the certain color, and the feature amount.

The noise reduction unit may perform the noise removal having a noise removal effect on the region in the certain color, the noise removal effect being stronger than a noise removal effect of the noise removal to be performed on another region. The noise reduction unit may perform the noise removal having a noise removal effect on a border of the region in the certain color, the noise removal effect being weaker than a noise removal effect of the noise removal to be performed on another region. The certain color may be an achromatic color.

The feature amount calculating unit may calculate the feature amount by performing edge detection. The feature amount calculating unit may calculate a flatness degree of luminance as the feature amount.

The noise reduction unit may perform the noise removal having a noise removal effect on a region, the noise removal effect being stronger than a noise removal effect of the noise removal to be performed on another region, the region having the flatness degree of luminance greater than or equal to a threshold.

The image processing device may further include a border region setting unit configured to calculate border information indicating typicality of a border of the region in the certain color on the basis of the result obtained by detecting the region in the certain color. The noise reduction unit may perform the noise removal on the input image by performing at least any one of processes different from each other in accordance with the border information and the feature amount. The processes different from each other may have different ranges of a region on the input image, the region being used for noise removal.

The noise reduction unit may include a reduction unit configured to reduce the input image, a first filter process unit configured to perform a filter process on the input image reduced by the reduction unit, an enlargement unit configured to enlarge the input image on which the first filter process unit has performed the filter process to a size of the input image before reduction by the reduction unit, a second filter process unit configured to perform a filter process on the input image, and a connection unit configured to supply the input image to at least any one of the reduction unit and the second filter process unit in accordance with the border information and the feature amount. The noise reduction unit may further include a first synthesis unit configured to synthesize an image acquired through enlargement by the enlargement unit with an image acquired through the filter process by the second filter process unit by using a first synthesizing coefficient decided on the basis of the result obtained by detecting the region in the certain color, and the feature amount.

The noise reduction unit may further include a second synthesis unit configured to synthesize an image acquired through synthesis by the first synthesis unit with the input image by using a second synthesis coefficient decided on the basis of the result obtained by detecting the region in the certain color, and the feature amount.

According to another embodiment of the present disclosure, there is provided an image processing method or a program including detecting a region in a certain color from an input image, calculating a feature amount related to luminance of the input image, and performing noise removal on the input image on the basis of a result obtained by detecting the region in the certain color, and the feature amount.

According to still another embodiment, a region in a certain color is detected from an input image. A feature amount related to luminance of the input image is calculated. Noise removal is performed on the input image on the basis of a result obtained by detecting the region in the certain color, and the feature amount.

According to one or more of embodiments of the present disclosure, it is possible to acquire an image having better image quality.

Additionally, the advantageous effects described here are not necessarily limited, but any of the advantageous effects described herein may also be attained.

BRIEF DESCRIPTION OF THE DRAWINGS

FIG. 8 is a diagram describing connection control over a switch;

FIG. 13 is a diagram describing connection control over a switch;

DETAILED DESCRIPTION OF THE EMBODIMENT(S)

Figure 1:
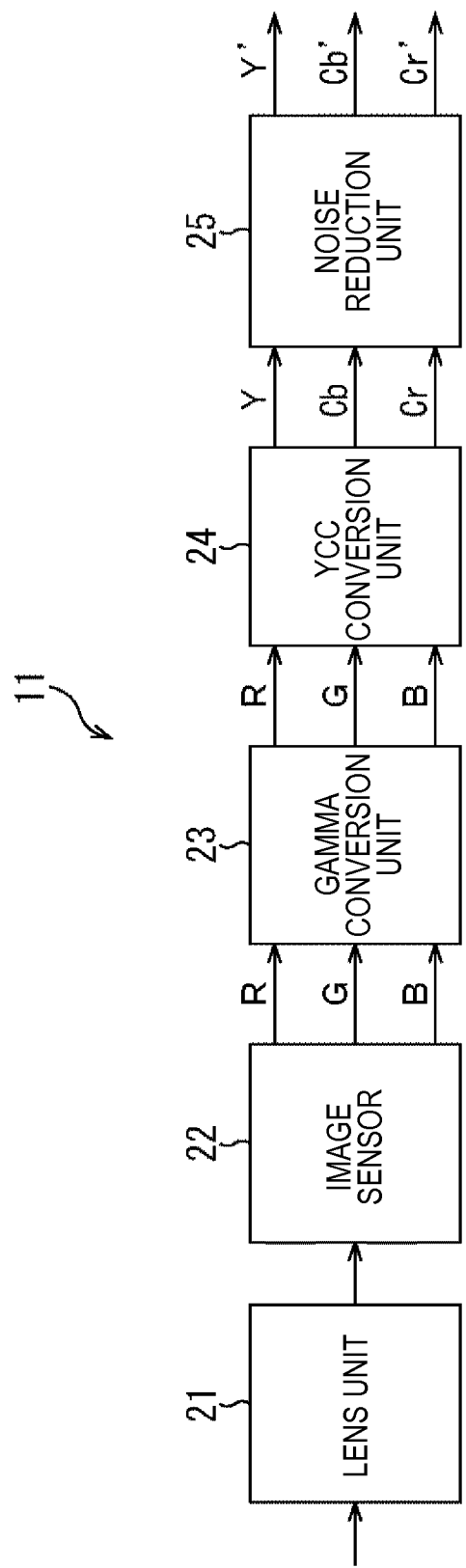
FIG. 1 is a diagram illustrating a configuration example of an imaging device.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

<First Embodiment>

<Configuration Example of Imaging Device>

The present technology detects a region in a certain color from an image, detects a feature amount related to luminance from the image, and performs a noise removal process on the image on the basis of a result obtained by detecting the region in the certain color and a result obtained by detecting the feature amount. Accordingly, it is possible to prevent resolution degradation and to strengthen a noise removal effect in a region in which color noise is easily perceived, so that an image having better image quality can be acquired.

A specific embodiment to which the present technology is applied will be described below.

FIG. 1 is a diagram illustrating a configuration example of an imaging device according to an embodiment to which the present technology is applied.

Examples of an imaging device 11 of FIG. 1 include a digital camera and a multi-functional mobile phone having an imaging function, and the imaging device 11 includes a lens unit 21, an image sensor 22, a gamma conversion unit 23, a YCC conversion unit 24, and a noise reduction unit 25.

The lens unit 21 is made of, for example, one or more lenses, a diaphragm, a shutter, and the like, condenses light incident from an object, and leads the condensed light to the image sensor 22. The image sensor 22 is made of, for example, a complementary metal oxide semiconductor (CMOS) image sensor or the like, images a subject by receiving the light incident from the lens unit 21 and carrying out photoelectric conversion on the received light, and supplies a resultant electrical signal to the gamma conversion unit 23 as RAW data of an image signal.

For example, color filters for R (red), G (green), and B (blue) are arranged on a light receiving surface of the image sensor 22 in so-called Bayer arrangement. This image sensor 22 thus outputs RAW data including color information for R, G, and B.

More specifically, the acquired RAW data undergoes a gain adjustment process and an analog/digital (A/D) conversion process in the image sensor 22, and the RAW data that has undergone these processes is supplied to the gamma conversion unit 23. The gamma conversion unit 23 performs a gamma conversion process on the RAW data supplied from the image sensor 22, and supplied the RAW data to the YCC conversion unit 24. The YCC conversion unit 24 converts the RAW data into YCC data, and supplies the YCC data to the noise reduction unit 25, the RAW data having been supplied from the gamma conversion unit 23 and including color information for R, G, and B.

Here, the YCC data includes a luminance signal (Y signal) and color difference signals (Cr signal and Cb signal). A red color difference signal will also be referred to as color difference signal Cr in particular, while a blue color difference signal will also be referred to as color difference signal Cb below.

The noise reduction unit 25 performs a noise removal process on the YCC data supplied from the YCC conversion unit 24, and outputs resultant YCC data as image data of an imaged captured image.

Here, the luminance signal (Y signal) included in the YCC data is the same before and after a noise removal process performed by the noise reduction unit 25, while the color difference signals included in the YCC data are different before and after the noise removal process. That is to say, the noise reduction unit 25 performs a noise removal process on color difference signals.

A color difference signal Cr after a noise removal process will also be referred to as color difference signal Cr' in particular, while a color difference signal Cb after a noise removal process will also be referred to as color difference signal Cb' below. A Y signal that is a luminance signal after a noise removal process will also be referred to as Y' signal. Furthermore, let us assume below that YCC data supplied from the YCC conversion unit 24 to the noise reduction unit 25 is also referred to as input image data of an input image.

<Description of Noise Removal Process>

Figure 2:
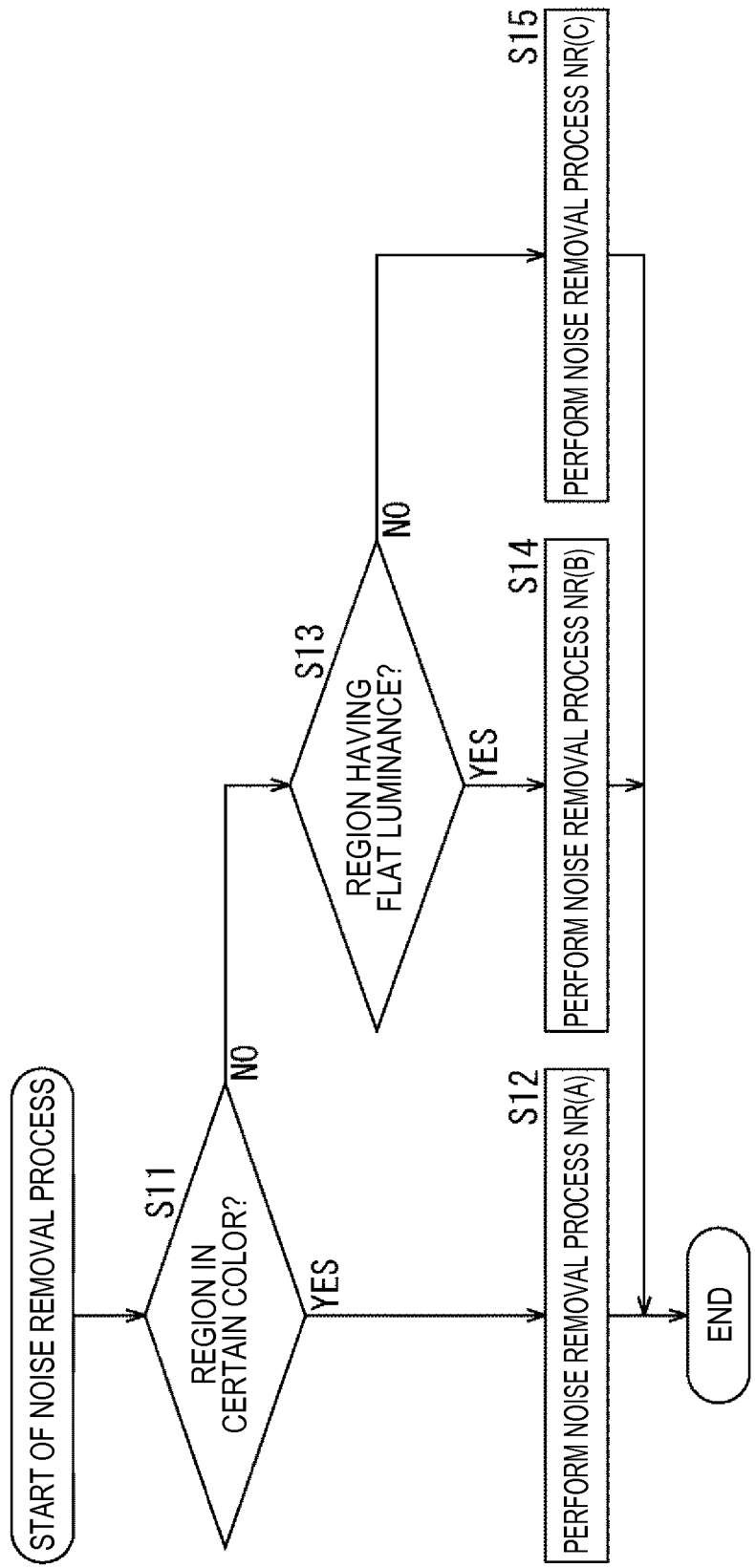
FIG. 2 is a flowchart describing a noise removal process.

Next, a noise removal process performed by the noise reduction unit 25 will be described with reference to the flowchart of FIG. 2.

When an input image is supplied to the noise reduction unit 25 from the YCC conversion unit 24, the noise reduction unit 25 performs a noise removal process of removing noise from the input image. This noise removal process is performed on each pixel of the input image. A pixel that is a process target of the input image will also be referred to as appropriate as process target pixel below.

In step S11, the noise reduction unit 25 determines whether a process target pixel of the input image is a pixel of a region in a certain color or not. Specifically, for example, if a process target pixel is an achromatic pixel, it is determined in step S11 that the process target pixel is a pixel of a region in a certain color. Here, the position of a process target pixel in a CrCb space specifies whether the process target pixel is an achromatic pixel or not, the position being decided by the values of chroma signals, or a color difference signal Cr and a color difference signal Cb, of the input image data.

The CrCb space is a color space using a color difference signal Cr as a Cr axis and a color difference signal Cb as a Cb axis. If the position of a process target pixel in the CrCb space is present within a predetermined range (region) in the CrCb space, the process target pixel is considered to be an achromatic pixel, the position being decided by the values of a color difference signal Cr and a color difference signal Cb.

If it is determined in step S11 that the process target pixel is a pixel of a region in a certain color, the noise reduction unit 25 performs, in step S12, a predefined noise removal process NR(A) on the process target pixel of the input image. The noise reduction unit 25 then regards the pixel value of a pixel resulting from the noise removal process NR(A) as the pixel value of a pixel of the captured image, and the noise removal process terminates.

Here, the noise removal process NR(A) is a filter process that attains a high noise removal effect by performing noise removal with pixels that cover a relatively wide range of the input image. Noise removal with pixels that cover a wide range can attain a higher noise removal effect because even low-frequency noise included in an image can be removed.

An achromatic region on an image is a region in which noise is easily perceived. If noise in an achromatic region is not sufficiently removed, the noise causes image quality to look degraded. In other words, noise in an achromatic region stands out, so that the image quality of an image feels more prominently degraded.

The noise reduction unit 25 then performs the noise removal process NR(A), which has a higher noise removal effect, on an achromatic region of the input image to sufficiently remove noise, so that a captured image having better image quality can be acquired. That is to say, an achromatic region of the input image undergoes noise removal having a stronger noise removal effect than a noise removal effect of noise removal to be performed on another region.

To the contrary, if it is determined in step S11 that the process target pixel is not a pixel of a region in a certain color, the noise reduction unit 25 determines in step S13 whether the process target pixel of the input image is a pixel of a region having flat luminance or not. Specifically, for example, if a flatness degree of luminance calculated on the basis of a luminance signal (Y signal) included in the input image data is greater than or equal to a predetermined threshold, it is determined that the process target pixel is a pixel of a region having flat luminance.

If it is determined in step S13 that the process target pixel is a pixel of a region having flat luminance, the noise reduction unit 25 performs, in step S14, a predefined noise removal process NR(B) on the process target pixel of the input image. The noise reduction unit 25 then regards the pixel value of a pixel resulting from the noise removal process NR(B) as the pixel value of a pixel of the captured image, and the noise removal process terminates.

Here, the noise removal process NR(B) is a filter process that attains a high noise removal effect by performing noise removal with pixels that cover a relatively wide range of the input image. This noise removal process NR(B) may be the same process as the noise removal process NR(A), or may be a different process from the noise removal process NR(A). A region on an image which has flat luminance is a region in which noise is easily perceived as in an achromatic region. If noise in a region having flat luminance is not sufficiently removed, the noise stands out. The noise reduction unit 25 then performs the noise removal process NR(B), which has a high noise removal effect, on a region of the input image which has flat luminance to sufficiently remove noise in a manner that a captured image having better image quality can be acquired. That is to say, a region of the input image which has flat luminance undergoes noise removal having a stronger noise removal effect than a noise removal effect of noise removal to be performed on another region.

If it is determined in step S13 that the process target pixel is not a pixel of a region having flat luminance, the noise reduction unit 25 performs, in step S15, a predefined noise removal process NR(C) on the process target pixel of the input image. The noise reduction unit 25 then regards the pixel value of a pixel resulting from the noise removal process NR(C) as the pixel value of a pixel of the captured image, and the noise removal process terminates.

Here, the noise removal process NR(C) is a filter process of performing noise removal with pixels that cover a relatively narrow range of the input image, and is considered to attain a lower noise removal effect than the above-described noise removal process NR(A) and the above-described noise removal process NR(B).

That is to say, the noise removal process NR(C) uses pixels covering a narrower range of the input image than in the noise removal process NR(A) and the noise removal process NR(B) to reduce noise. Accordingly, the noise removal process NR(C) is a process having lower filter strength or a lower noise removal effect than the noise removal process NR(A) and the noise removal process NR(B).

Resolution degradation caused by noise removal is easily perceived in a region on an image which has non-flat luminance, or a region having a large number of edge components. The noise reduction unit 25 then performs the noise removal process NR(C), which has a low noise removal effect, on a region on the input image which has non-flat luminance to prevent the image quality from degrading in a manner that a captured image having better image quality can be acquired.

In particular, the noise removal process NR(C) is performed on a border region between an achromatic region and a chromatic region in this example, the border region having non-flat luminance. Since resolution degradation is easily perceived in a border region between an achromatic region and a chromatic region, a weaker noise removal effect is attained in such a region, so that a captured image having better image quality can be acquired.

In this way, the noise reduction unit 25 performs a noise removal process suitable for each region on the basis of whether a process target region of the input image is a region in a certain color or not, and whether a process target region of the input image is a region having flat luminance or not. For example, noise removal having a stronger noise removal effect is performed on an achromatic region or a region having flat luminance, in which noise easily stands out, while noise removal having a weaker noise removal effect is performed on a border region between an achromatic region and a chromatic region, in which resolution degradation is easily perceived, the border region having non-flat luminance. This can sufficiently remove noise and prevent image quality from degrading, so that a captured image having better image quality can be acquired.

<Configuration Example of Noise Reduction Unit>

Next, a more specific configuration of the noise reduction unit 25 illustrated in FIG. 1 will be described.

Figure 3:
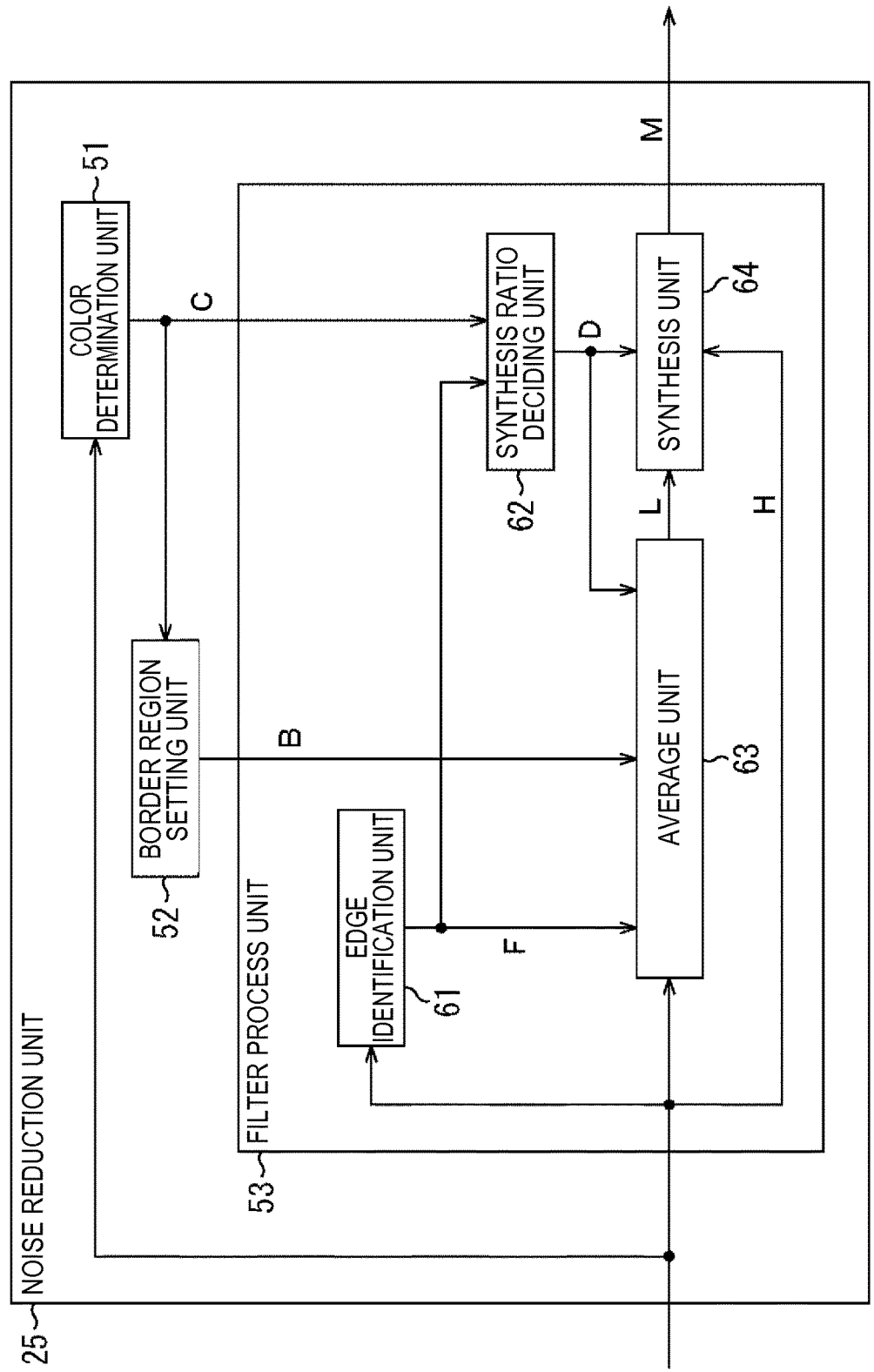
FIG. 3 is a diagram illustrating a configuration example of a noise reduction unit.

FIG. 3 is a diagram illustrating a more specific configuration example of the noise reduction unit 25.

The noise reduction unit 25 illustrated in FIG. 3 includes a color determination unit 51, a border region setting unit 52, and a filter process unit 53.

The color determination unit 51 detects a certain color region on an input image on the basis of the input image supplied from the YCC conversion unit 24. For example, the certain color region to be detected is considered to be a region in a color that makes color noise easy to perceive, which specifically means an achromatic region. In this case, the color determination unit 51 calculates an achromatic color degree C in each region of the input image on the basis of the input image, and supplies the calculated achromatic color degree C to the border region setting unit 52 and the filter process unit 53.

The border region setting unit 52 generates border information B indicating a border between an achromatic region and a chromatic region on the basis of the achromatic color degree C supplied from the color determination unit 51, and supplies the generated border information B to the filter process unit 53.

The filter process unit 53 performs a filter process (noise removal process) on the input image supplied from the YCC conversion unit 24 on the basis of the achromatic color degree C supplied from the color determination unit 51 and the border information B supplied from the border region setting unit 52, and outputs a resultant captured image. Here, the filter process performed by the filter process unit 53 corresponds to the above-described noise removal process NR(A), noise removal process NR(B), and noise removal process NR(C).

Additionally, the filter process performed by the filter process unit 53 is an example of the noise removal process NR(A), the noise removal process NR(B), and the noise removal process NR(C), and any other filter process may be used as long as noise removal having a stronger noise removal effect is performed on a region in which noise easily stands out, and noise removal having a weaker noise removal effect is performed on a region in which resolution degradation is easily perceived.

In addition, the filter process unit 53 includes an edge identification unit 61, a synthesis ratio deciding unit 62, an average unit 63, and a synthesis unit 64. The edge identification unit 61 calculates a luminance feature amount F that is a feature amount related to the luminance (brightness) of the input image on the basis of the input image supplied from the YCC conversion unit 24, and supplies the calculated luminance feature amount F to the synthesis ratio deciding unit 62 and the average unit 63. The synthesis ratio deciding unit 62 calculates a predetermined synthesis ratio D on the basis of the achromatic color degree C supplied from the color determination unit 51 and the luminance feature amount F supplied from the edge identification unit 61, and supplies the calculated predetermined synthesis ratio D to the average unit 63 and the synthesis unit 64.

The average unit 63 performs a filter process on the input image supplied from the YCC conversion unit 24 on the basis of the border information B supplied from the border region setting unit 52, the luminance feature amount F supplied from the edge identification unit 61, and the synthesis ratio D supplied from the synthesis ratio deciding unit 62, and supplies a resultant smoothed image to the synthesis unit 64.

For example, the average unit 63 performs noise removal having a weaker noise removal effect on a border region of the input image between an achromatic region and a chromatic region than a noise removal effect of noise removal to be performed on the other regions. In addition, for example, the average unit 63 performs noise removal having a stronger noise removal effect on a region of the input image which has a large luminance feature amount F, or which has flat luminance than a noise removal effect of noise removal to be performed on the other regions.

Furthermore, for example, the average unit 63 may perform noise removal having a stronger noise removal effect on an achromatic region of the input image than a noise removal effect of noise removal to be performed on the other regions.

The synthesis unit 64 synthesizes the smoothed image (which will also be referred to as smoothed image L below) supplied from the average unit 63 with the input image (which will also be referred to as input image H below) supplied from the YCC conversion unit 24 on the basis of the synthesis ratio D supplied from the synthesis ratio deciding unit 62, and outputs a resultant captured image. The captured image output from the synthesis unit 64 will also be referred to as captured image M below.

<Regarding Achromatic Color Degree and Border Information>

Next, each information used for a noise removal process performed by the noise reduction unit 25 will be more specifically described.

First of all, the achromatic color degree C acquired by the color determination unit 51 is decided by the values of a color difference signal Cr and a color difference signal Cb included in the input image. For example, each region (position) in a CrCb space is associated with a value in advance, the value indicating a degree of the typicality of an achromatic color.

For each pixel of the input image, the color determination unit 51 decides, as an achromatic color degree C of each pixel, a value indicating a degree of the typicality of an achromatic color decided by the values of a color difference signal Cr and a color difference signal Cb of each pixel. The achromatic color degree C has a larger value as a target region of the input image is more typical of an achromatic region.

The border region setting unit 52 separates an achromatic region and a chromatic region in the input image on the basis of, for example, the achromatic color degree C, and generates border information B indicating that border. Here, the border information B has a larger value as the border information B indicates a more typical border position between an achromatic region and a chromatic region.

Figure 4:
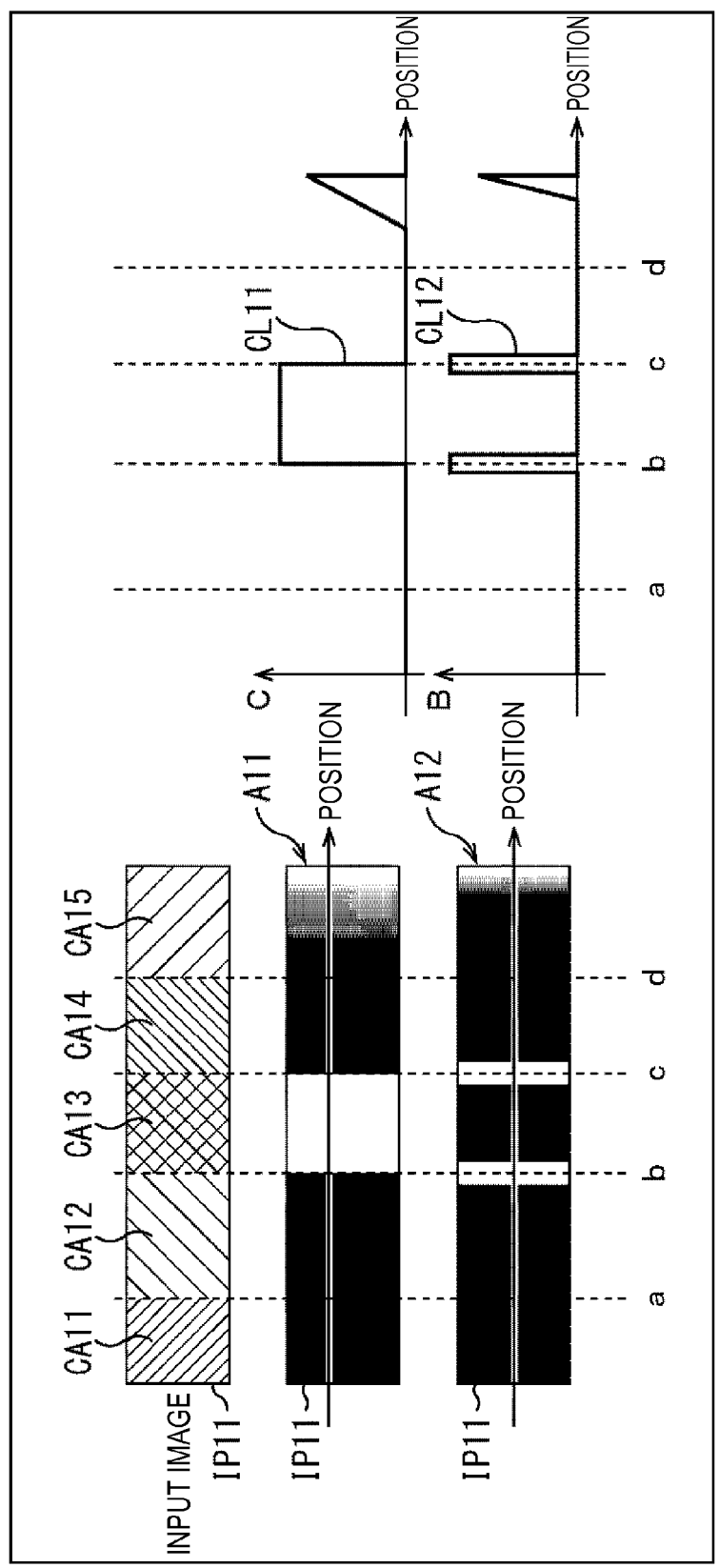
FIG. 4 is a diagram describing an achromatic color degree and border information.

Specifically, for example, information illustrated in FIG. 4 is acquired as the achromatic color degree C and the border information B.

Additionally, the transverse direction indicates a pixel column direction of the input image in FIG. 4.

For example, an input image IP11 generally includes five color regions CA11 to CA15 in this example. Here, a, b, c, and d indicate, in FIG. 4, a border position between the color region CA11 and the color region CA12, a border position between the color region CA12 and the color region CA13, a border position between the color region CA13 and the color region CA14, and a border position between the color region CA14 and the color region CA15, respectively.

When the color determination unit 51 computes an achromatic color degree C for this input image IP11, a result indicated by an arrow A11 is, for example, acquired. Shades of each region of the input image IP11 represent an achromatic color degree C in the example indicated by the arrow A11, and mean that a region of a lighter shade has a higher achromatic color degree C.

The color region CA11, the color region CA12, and the color region CA14 are dark shades in this example, showing these color regions are typical of achromatic regions. To the contrary, the color region CA13 is a light shade, showing that the color region CA13 is typical of an achromatic region. In addition, the color region CA15 is a darker shade on the right side in the figure, showing that the right side of the color region CA15 is more typical of an achromatic region in the figure. A computation result of an achromatic color degree C indicated by the arrow A11 for a pixel column including the respective pixels arranged in the transverse direction of the input image IP11 in the figure is, for example, illustrated as a broken line CL11 in the right part of the figure. Additionally, the transverse axis indicates a position on the input image IP11 in the achromatic color degree C indicated by the broken line CL11, while the longitudinal axis indicates the value of the achromatic color degree C. The achromatic color degree C of the color region CA13 has a given large value in the example indicated by the broken line CL11. The achromatic color degree C of the color region CA15 has a larger value at a position nearer to the right side of the figure, so that the value of the achromatic color degree C linearly changes.

Furthermore, for example, border information B indicated by an arrow A12 is acquired from this achromatic color degree C. Shades of each region of the input image IP11 represent the typicality of an achromatic border in the example indicated by the arrow A12, and indicate that a region of a lighter shade has a high border degree, or a larger value of the border information B.

A region near a border b, a region near a border c, and a region near the right end of the color region CA15 in the figure are light shades in this example, showing that these regions are typical of border regions between an achromatic region and a chromatic region.

A computation result of the border information B indicated by the arrow A12 for a pixel column including the respective pixels arranged in the transverse direction of the input image IP11 in the figure is, for example, illustrated as a broken line CL12 in the right part of the figure. Additionally, the transverse axis indicates a position on the input image IP11 in the border information B indicated by the broken line CL12, while the longitudinal axis indicates the value of the border information B.

The border information B has a given large value near the border b or the border c in the example indicated by the broken line CL12. The border information B of the color region CA15 has a larger value at a position nearer to the right side of the figure, so that the value of the border information B linearly changes.

<Regarding Luminance Feature Amount>

For example, the edge identification unit 61 performs edge detection on a luminance signal included in the input image supplied from the YCC conversion unit 24; in other words, the edge identification unit 61 performs a filter process using a filter such as a Laplacian filter and a Sobel filter. The reciprocal of edge strength of each region which is acquired through the filter process is then obtained, and used as a luminance feature amount F.

Figure 5:
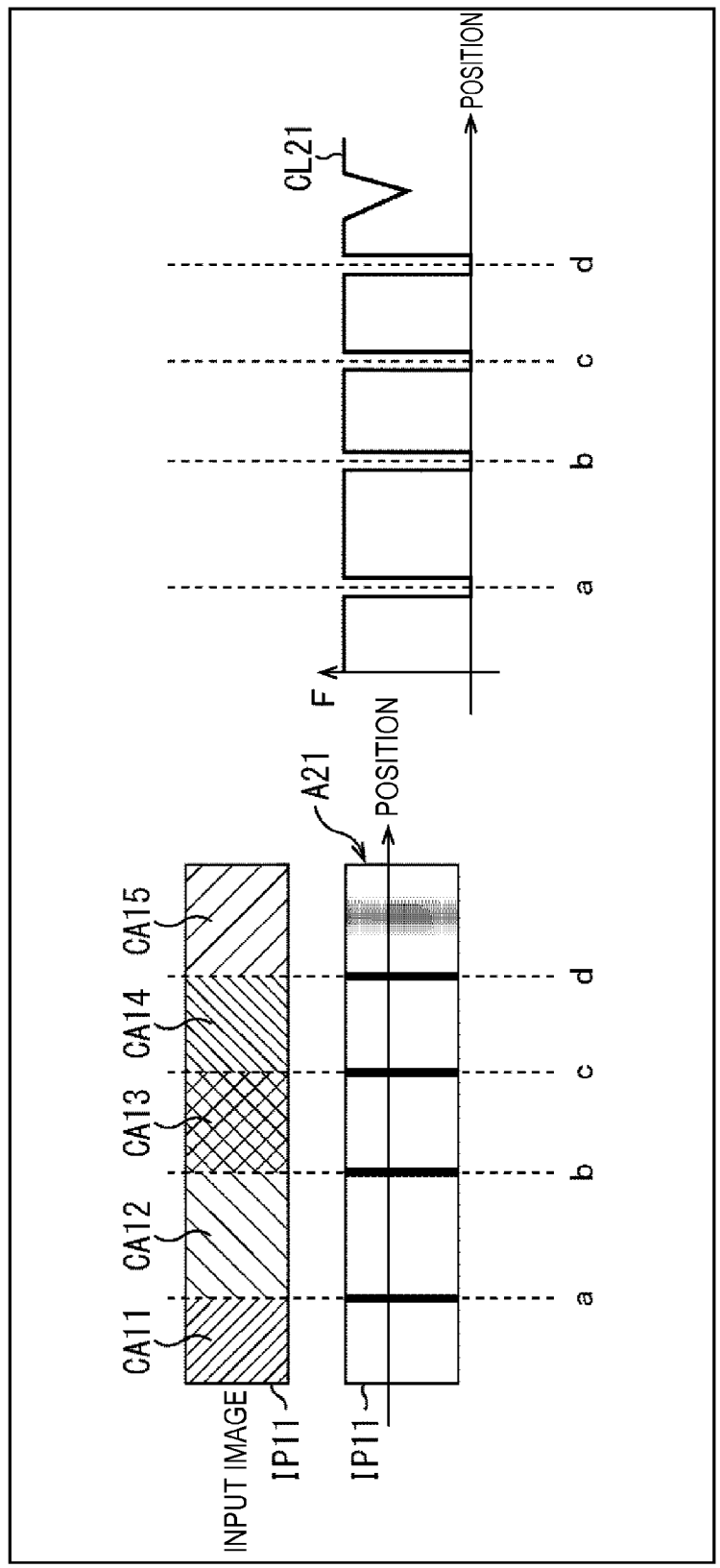
FIG. 5 is a diagram describing a luminance feature amount.

More specifically, the edge strength of each region is moderately shaped and then the reciprocal of the edge strength is obtained in a manner that a region on the input image which has high edge strength, or a border such as an outline between different color regions is clearer. If edge detection is performed and a luminance feature amount F is obtained in this way, a luminance feature amount F indicated by an arrow A21 is, for example, obtained for the input image IP11 as illustrated in FIG. 5. Additionally, the parts in FIG. 5 which corresponds to the parts in FIG. 4 are denoted with the same reference numerals, and the description thereof will be omitted as appropriate.

Shades of each region of the input image IP11 represent the reciprocal of edge strength in the example indicated by the arrow A21 of FIG. 5, and indicate that a region of a darker shade has higher edge strength (the reciprocal of the edge strength is smaller), or a smaller value of the luminance feature amount F.

A region near each of borders a, b, c and d, and a region near the central region of the color region CA15 in the figure are dark shades in this example, showing that these regions have high edge strength, or a considerable change in luminance. In other words, it is illustrated that a region of a darker shade is a region that has a less change in luminance and has flat luminance. Since the luminance feature amount F is a value indicating the reciprocal of edge strength, it can be said that the value of the luminance feature amount F indicates a flatness degree of the luminance of the input image. In addition, since a border between respective objects (color regions) is supposed to have higher edge strength, it can also be said that the luminance feature amount F indicates a border position between the objects.

A computation result of the luminance feature amount F indicated by the arrow A21 for a pixel column including the respective pixels arranged in the transverse direction of the input image IP11 in the figure is, for example, illustrated as a broken line CL21 in the right part of the figure. Additionally, the transverse axis indicates a position on the input image IP11 in the luminance feature amount F indicated by the broken line CL21, while the longitudinal axis indicates the value of the luminance feature amount F.

The luminance feature amount F has a small value in a region near each of the borders a, b, c, and d in the example indicated by the broken line CL21, while the luminance feature amount F has a given large value in the other regions from the color region CA11 to the left end of the color region CA15. It is also shown that the color region CA15 has some parts in which the value of the luminance feature amount F grows smaller to some extent at the center of the color region 15 in the figure, and these parts are also regions typical of borders between an achromatic region and a chromatic region.

<Regarding Synthesis Ratio>

Figure 6:
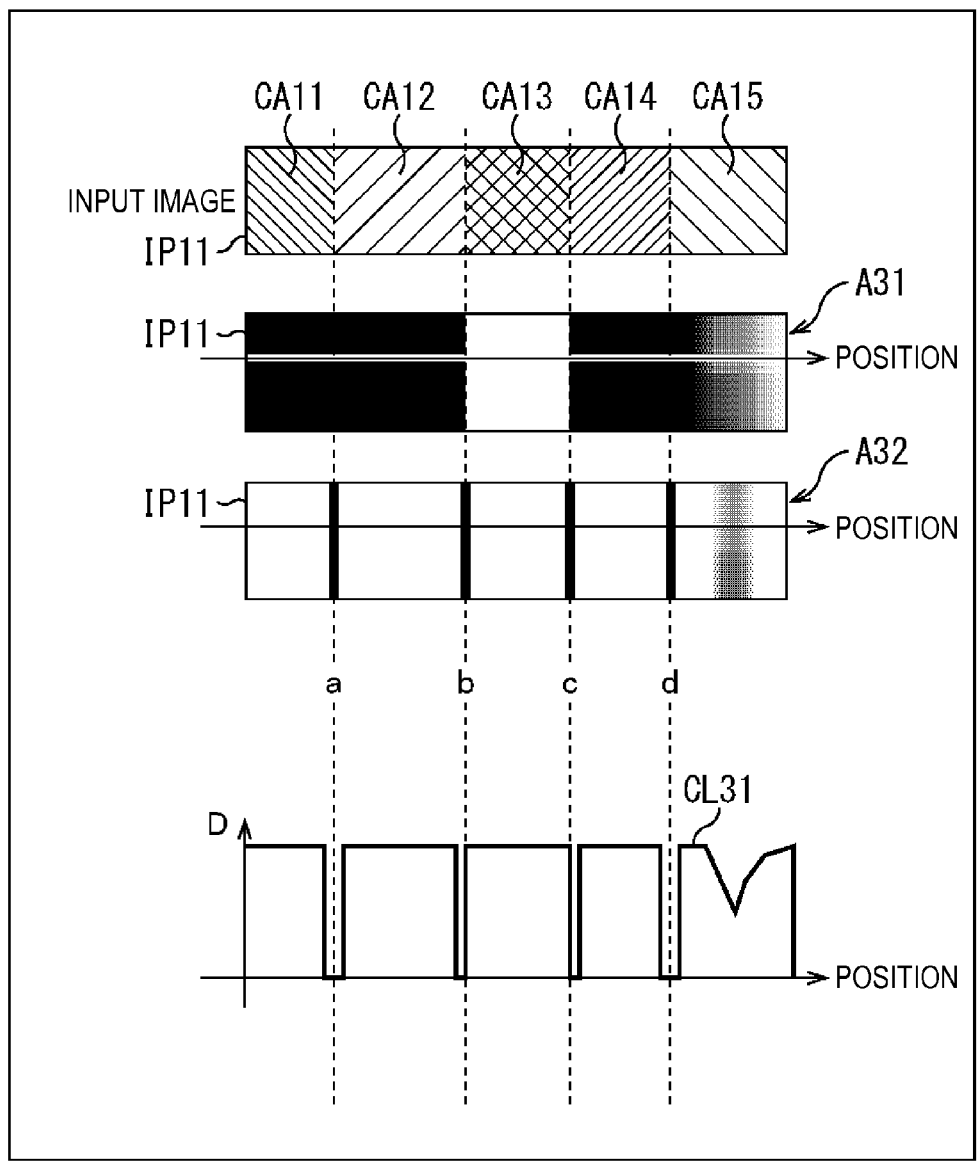
FIG. 6 is a diagram describing a synthesis ratio.

Furthermore, the synthesis ratio deciding unit 62 calculates, for example, the synthesis ratio D illustrated in FIG. 6 on the basis of the achromatic color degree C illustrated in FIG. 4 and the luminance feature amount F illustrated in FIG. 5. Additionally, the parts in FIG. 6 which correspond to the parts in FIG. 4 or FIG. 5 are denoted with the same reference numerals, and the description thereof will be omitted.

A computation result of the achromatic color degree C indicated by an arrow A31, and a computation result of the luminance feature amount F indicated by an arrow A32 are acquired for the input image IP11 in the example of FIG. 6. Additionally, the computation result of the achromatic color degree C indicated by the arrow A31 is the same as the computation result indicated by the arrow A11 of FIG. 4, while the computation result of the luminance feature amount F indicated by the arrow A32 is the same as the computation result indicated by the arrow A21 of FIG. 5.

The synthesis ratio deciding unit 62 uses, for each pixel position of the input image IP11, a maximum value of the value of an achromatic color degree C and the value of a luminance feature amount F at each pixel position as the value of the synthesis ratio D at each pixel position. More specifically, for example, the achromatic color degree C and the luminance feature amount F are normalized in a manner that each maximum value of the achromatic color degree C and the luminance feature amount F is 1. In this way, the synthesis ratio D is calculated using the value of one of the achromatic color degree C and the luminance feature amount F, which has a larger value, as the synthesis ratio D, and a computation result of the synthesis ratio D for a pixel column including the respective pixels arranged in the transverse direction of the input image IP11 in the figure is, for example, illustrated as a broken line CL31 in the bottom of the figure. Additionally, the transverse axis indicates a position on the input image IP11 in the synthesis ratio D indicated by the broken line CL31, while the longitudinal axis indicates the value of the synthesis ratio D. The synthesis ratio D acquired in this way is used for synthesizing two input images that have undergone filter processes different from each other and deciding, when a smoothed image L and an input image H, a contribution ratio of each image.

Additionally, it was described here that a maximum value of the achromatic color degree C and the luminance feature amount F is used as the synthesis ratio D, but the synthesis ratio D may be obtained in any way. For example, the achromatic color degree C. may be added to the luminance feature amount F, the achromatic color degree C may be multiplied by the luminance feature amount F, and the value of one of the achromatic color degree C and the luminance feature amount F may be selected to calculate the synthesis ratio D.

<Configuration Example of Average unit>

Figure 7:
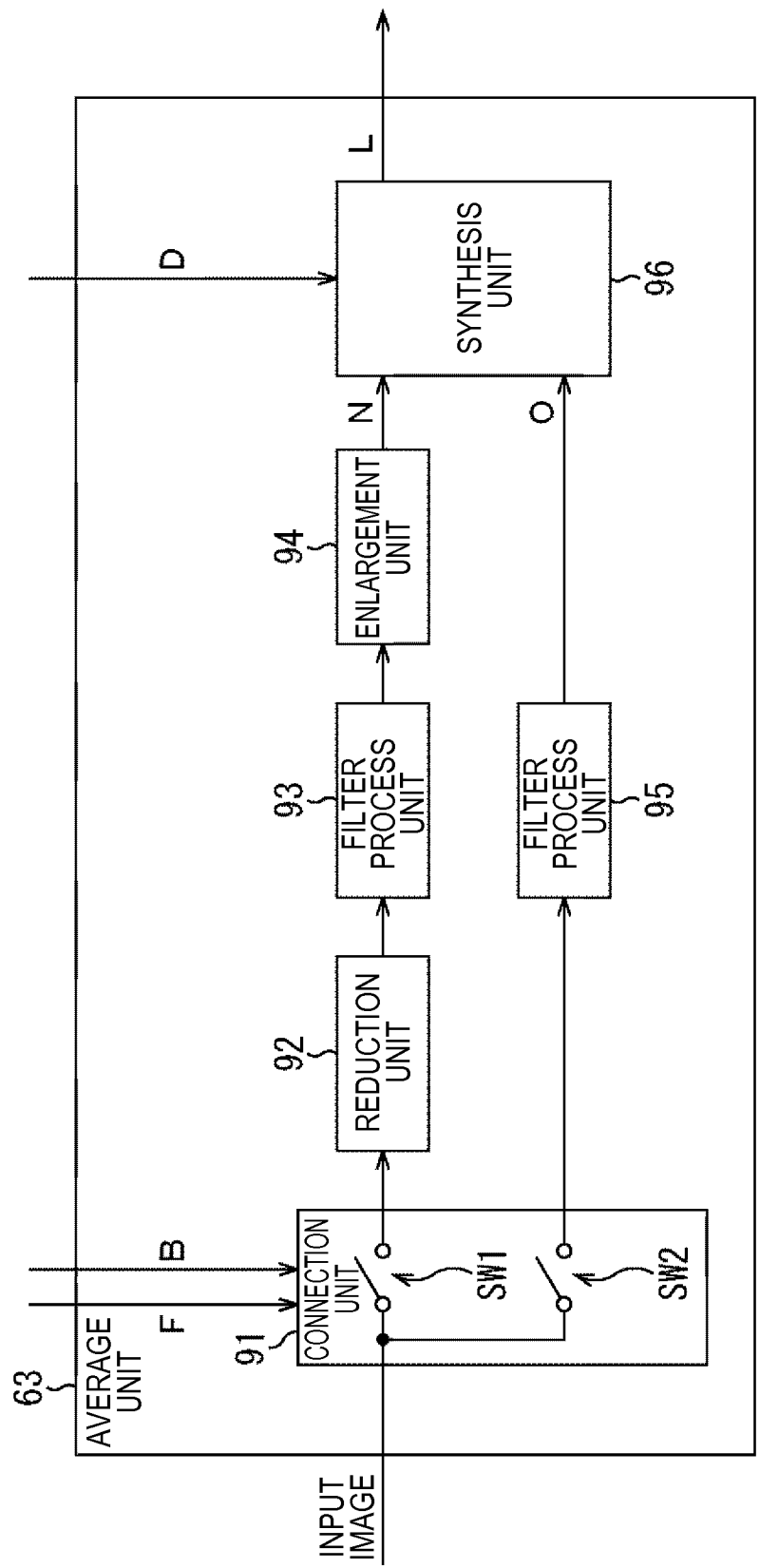
FIG. 7 is a diagram illustrating a configuration example of an average unit.

Next, a specific configuration of the average unit 63 illustrated in FIG. 3 will be described. More specifically, the average unit 63 is configured, for example, as illustrated in FIG. 7. The average unit 63 illustrated in FIG. 7 includes a connection unit 91, a reduction unit 92, a filter process unit 93, an enlargement unit 94, a filter process unit 95, and a synthesis unit 96.

The connection unit 91 supplies the input image supplied from the YCC conversion unit 24 to at least one of the reduction unit 92 and the filter process unit 95. That is to say, the connection unit 91 includes a switch SW1 for supplying the input image to the reduction unit 92 and a switch SW2 for supplying the input image to the filter process unit 95. The connection unit 91 controls connections of the switch SW1 and the switch SW2 on the basis of the border information B supplied from the border region setting unit 52 and the luminance feature amount F supplied from the edge identification unit 61, and controls the supply of the input image.

The reduction unit 92 reduces the input image supplied from the switch SW1, and supplies the reduced input image to the filter process unit 93. For example, the reduction unit 92 reduces the input image to a size of $\frac{1}{10}$.

The filter process unit 93 performs a filter process on the input image supplied from the reduction unit 92 by using a smoothing filter to remove noise from the input image, and supplies the input image that has undergone the filter process to the enlargement unit 94.

For example, a smoothing filter weights and adds the pixel values of the pixels in a region of 3 pixels×3 pixels around a process target pixel on the input image with filter factors to obtain the pixel value of the process target pixel that has undergone the filter process. That is to say, a process target pixel is smoothed using 3 pixels×3 pixels.

Here, the filter factors for the respective pixels may have the same value in a manner that the computation of weighting and addition is computation of an average value. Since the input image is reduced to a size of $\frac{1}{10}$ by the reduction unit 92 in this example, a range that is a process target of a smoothing filter, or a range of a region used for a filter process is substantially a region of 30 pixels×30 pixels.

Thus, the reduction unit 92 reduces the input image in this example, so that a filter process having high filter strength can be performed on the input image with less calculation. In other words, noise within a wider range, or low-frequency noise can be removed in a shorter processing time.

The enlargement unit 94 enlarges the input image supplied from the filter process unit 93 to the original size, or the size of the input image before reduction by the reduction unit 92, and supplies the enlarged input image to the synthesis unit 96. Since the input image has been reduced to a size of $\frac{1}{10}$ by the reduction unit 92 in this example, the enlargement unit 94 enlarges the input image ten times in size. The input image output from the enlargement unit 94 will also be referred to as input image N below.

The filter process unit 95 performs a filter process on the input image supplied from the switch SW2 by using a smoothing filter to remove noise from the input image, and supplies the input image that has undergone the filter process to the synthesis unit 96. The input image output from the filter process unit 95 will also be referred to as input image O below.

For example, a smoothing filter used by the filter process unit 95 is the same as a smoothing filter used by the filter process unit 93.

In this case, the filter process unit 95 uses the pixels in a region of 3 pixels×3 pixels around a process target pixel on the input image to perform a filter process. Accordingly, a filter process performed by the filter process unit 93 has a wider processing range (greater processing unit) than a filter process performed by the filter process unit 95 in an amount in which the input image has been reduced by the reduction unit 92; in other words, the filter process performed by the filter process unit 93 has higher filter strength and attains a higher noise removal effect.

The synthesis unit 96 synthesizes the input image N supplied from the enlargement unit 94 with the input image O supplied from the filter process unit 95 on the basis of the synthesis ratio D supplied from the synthesis ratio deciding unit 62, and supplies a resultant smoothed image L to the synthesis unit 64.

In this way, the average unit 63 performs at least any one of a filter process performed substantially by the reduction unit 92, the filter process unit 93 and the enlargement unit 94, and a filter process performed by the filter process unit 95 on the input image to generate a smoothed image L.

The connection and disconnection of the switch SW1 and the switch SW2 by the connection unit 91 will be now described with reference to FIG. 8.

For example, the connection unit 91 compares a luminance feature amount F with a predefined threshold Th1 and compares border information B with a predefined threshold Th2, and decides a supply destination of an input image in accordance with results of the comparison.

In this example, when the luminance feature amount F is greater than or equal to the threshold Th1 and the border information B is also greater than or equal to the threshold Th2, the switch SW1 is disconnected or off and the switch SW2 is connected or on.

Here, while the switch SW1 is disconnected, the input image is not supplied to the reduction unit 92. Meanwhile, while the switch SW2 is connected, the input image is supplied to the filter process unit 95.

When the luminance feature amount F is greater than or equal to the threshold Th1, a process target region of the input image is a region having flat luminance to some extent. Meanwhile, when the border information B is greater than or equal to the threshold Th2, a process target region of the input image is a region typical of a border between an achromatic region and a chromatic region.

When a border region between an achromatic region and a chromatic region which has flat luminance is a process target region in this way, too high (strong) noise removal effect causes the degradation of image quality due to resolution degradation to stand out.

Accordingly, when the luminance feature amount F is greater than or equal to the threshold Th1 and the border information B is also greater than or equal to the threshold Th2, the connection unit 91 causes the input image to be supplied to the filter process unit 95 alone and moderately performs noise removal to an extent to which the image quality of the input image does not degrade.

Meanwhile, when the luminance feature amount F is greater than or equal to the threshold Th1 and the border information B is less than the threshold Th2, the switch SW1 is connected and the switch SW2 is disconnected.

Here, while the switch SW1 is connected, the input image is supplied to the reduction unit 92, and while the switch SW2 is disconnected, the input image is not supplied to the filter process unit 95.

When the luminance feature amount F is greater than and equal to the threshold Th1 and the border information B is less than the threshold Th2, a process target region of the input image is a region that has flat luminance to some extent, but is not a border region between a chromatic region and an achromatic region.

Even if a somewhat high (strong) noise removal effect is attained in this region that has flat luminance, but is not a border region between a chromatic region and an achromatic region, the degradation of image quality due to resolution degradation does not stand out. To the contrary, color noise easily stands out in a part having flat luminance and an achromatic region.

Accordingly, when the luminance feature amount F is greater than or equal to the threshold Th1 and the border information B is less than the threshold Th2, the connection unit 91 causes only the filter process unit 93 to perform noise removal. As discussed above, the filter process unit 93 substantially applies a smoothing filter having a large processing unit to the input image. This sufficiently removes noise in a filter process (noise removal process) having a large processing unit and relatively high filter strength, or a relatively high noise removal effect, so that a captured image having better image quality can be acquired. That is to say, it is possible to improve a visual characteristic of a captured image.

Additionally, a noise removal process having a relatively high noise removal effect is performed on a chromatic region having flat luminance in this case. However, even a chromatic region does not cause the degradation of image quality due to resolution degradation to stand out so much if the chromatic region is not a border but has flat luminance.

Meanwhile, when the luminance feature amount F is less than the threshold Th1 and the border information B is greater than or equal to the threshold Th2, the switch SW1 is disconnected and the switch SW2 is connected. In this case, a process target region of the input image is not a region having flat luminance, but a border region between a chromatic region and an achromatic region.

Accordingly, the connection unit 91 causes the input image to be supplied to the filter process unit 95 alone, and performs noise removal to an extent to which the image quality of the input image does not degrade. That is to say, a smoothing filter having a small processing unit is applied to the input image.

Furthermore, when the luminance feature amount F is less than the threshold Th1 and the border information B is also less than the threshold Th2, both of the switch SW1 and the switch SW2 are connected.

Even if a somewhat high noise removal effect is attained, the degradation of image quality due to resolution degradation does not stand out so much because a process target region of the input image is not a region having flat luminance, but is a region that is not a border between a chromatic region and an achromatic region in this case.

Accordingly, the connection unit 91 causes both of the filter process unit 93 and the filter process unit 95 to perform noise removal in order to attain a somewhat high noise removal effect without utterly degrading resolution.

A noise removal effect or filter strength of noise removal performed by both of the filter process unit 93 and the filter process unit 95 is lower than a noise removal effect or filter strength of noise removal performed by the filter process unit 93 alone, but higher than a noise removal effect or filter strength of noise removal performed by the filter process unit 95 alone.

One or two supply destinations of the input image are selected in this way, and a filter process is performed on the input image. In particular, the connection unit 91 controls connections of the switches on the basis of the two information of the border information B and the luminance feature amount F, so that filters can be smoothly switched; in other words, noise removal processes can be smoothly switched. The weakest noise removal effect is attained in a border between an achromatic region and a chromatic region, a stronger noise removal effect is attained in a region that is not a border between an achromatic region and a chromatic region than a noise removal effect in a region having flat luminance in the example illustrated in FIG. 8.

Incidentally, when one or two supply destinations of the input image are selected and a filter process is performed on the input image, at least one of an input image N and an input image O is supplied to the synthesis unit 96. When any one of an input image N and an input image O is supplied to the synthesis unit 96, the synthesis unit 96 regards the as-supplied input image as a smoothed image L and supplies the input image to the synthesis unit 64 in a subsequent stage.

In contrast, when both of an input image N and an input image O are supplied to the synthesis unit 96, the synthesis unit 96 uses synthesis coefficients α and β decided on the basis of a synthesis ratio D to synthesize the input image N with the input image O, and uses the synthesized input image as a smoothed image L.

Figure 9:
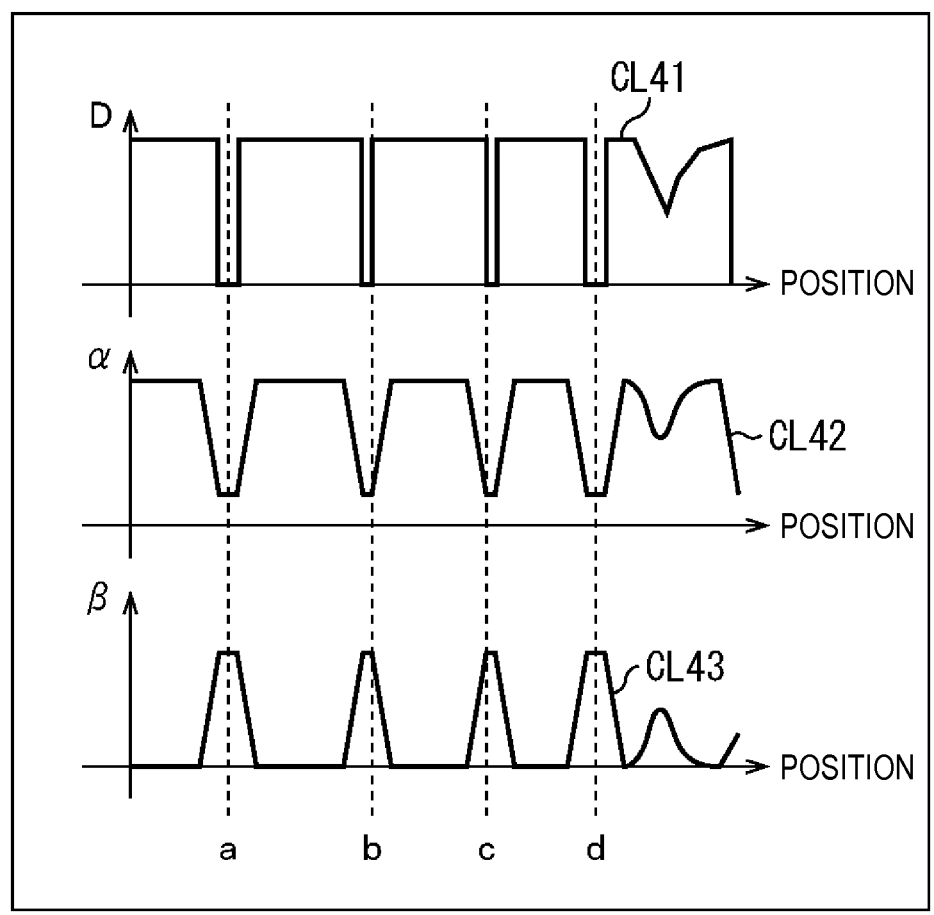
FIG. 9 is a diagram describing a synthesis coefficient.

For example, when what is indicated by a broken line CL41 in FIG. 9 is supplied as a synthesis ratio D, the synthesis unit 96 uses a synthesis coefficient α indicated by a curve CL42 and a synthesis coefficient β indicated by a curve CL43 to perform a synthesis process.

Additionally, the transverse axis indicates a position in the input image in FIG. 9, while the longitudinal axis indicates a synthesis ratio D, the synthesis coefficient α, or the synthesis coefficient β. In addition, the synthesis ratio D indicated by the broken line CL41 is the same as the synthesis ratio D indicated by the broken line CL31 in FIG. 6, while a, b, c, and d in FIG. 9 indicate border positions between respective color regions in the same way as in FIG. 6.

The value of a synthesis coefficient α at each position in the input image is substantially the same as the value of a synthesis ratio D at the same position in the example of FIG. 9. However, the value of a synthesis coefficient α linearly changes in a position direction in a border between respective color regions; in other words, the value changes more gently than the value of a synthesis ratio D does. The value of a synthesis coefficient β is decided in a manner that the value of the synthesis coefficient β satisfies α+β=1 with the value of a synthesis coefficient α at the same position.

The input image N is multiplied by the synthesis coefficient α, the input image O is multiplied by the synthesis coefficient β, and the input images multiplied by these synthesis coefficients are added (synthesized) and used as a smoothed image L in a synthesis process. That is to say, L=αN+βO is satisfied.

In this case, a contribution ratio of the input image O for the generation of the smoothed image L is configured to be high in a border between an achromatic color and a chromatic color and a part having non-flat luminance, in which image quality easily degrades. That is to say, a noise removal effect is weakened. Conversely, a contribution ratio of the input image N for the generation of the smoothed image L is configured to be high in a part having flat luminance, an achromatic region, and the like, in which image quality is difficult to degrade and color noise easily stands out. That is to say, a noise removal effect is strengthened.

A contribution ratio of the input image N or the input image O for the generation of the smoothed image L is changed in accordance with a characteristic of a region of the input image in this way, thereby allowing a noise removal process performed by the entire filter process unit 53 to have appropriate strength in each region; in other words, the filter strength (noise removal effect) of a filter process can be appropriate in each region. Accordingly, it is possible to acquire a smoothed image L that has noise sufficiently removed and has satisfactory image quality.

In addition, if the input image N is synthesized with the input image O in accordance with the synthesis ratio D, which changes depending on the achromatic color degree C and the luminance feature amount F, neighboring regions on the input image which have been processed with different filter strength can be smoothly connected.

Additionally, it has been described that the synthesis coefficient α and the synthesis coefficient β illustrated in FIG. 9 are used for a synthesis process. However, a synthesis coefficient may be decided in a manner that a contribution ratio of the input image N is high in a region such as a part having flat luminance and an achromatic region, in which noise stands out, and a contribution ratio of the input image O is high in a region such as a border between a chromatic region and an achromatic region, in which the degradation of image quality due to noise removal easily stands out.

Figure 10:
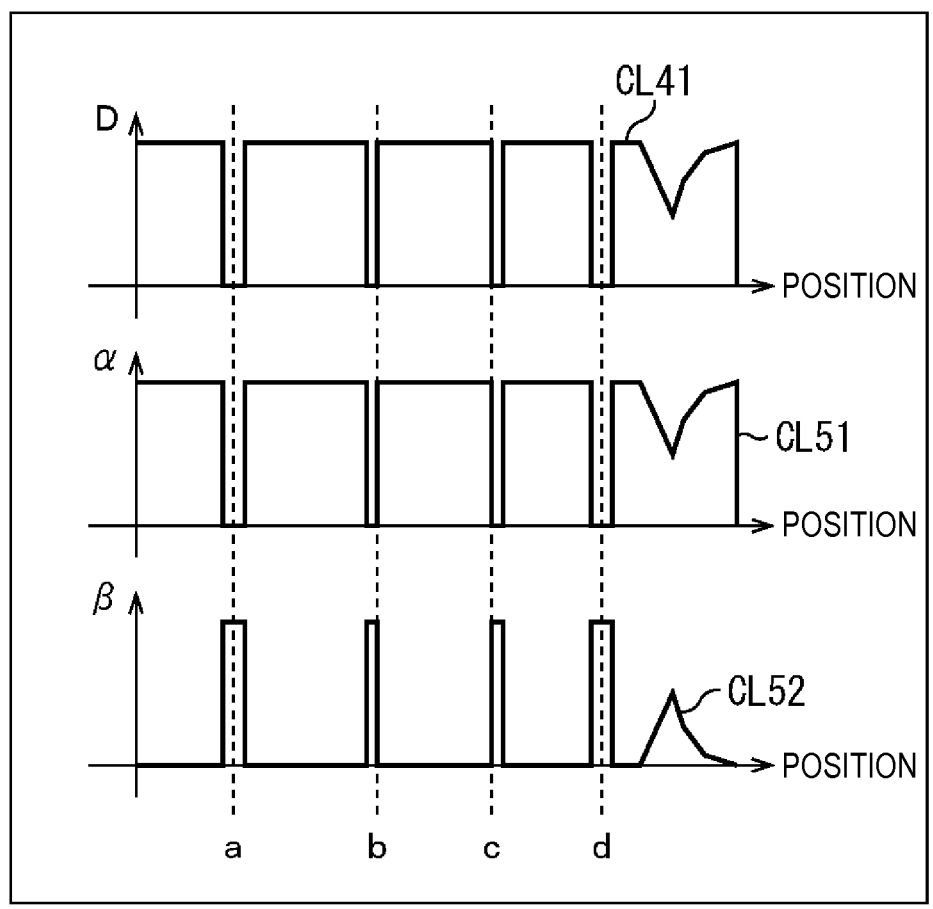
FIG. 10 is a diagram describing a synthesis coefficient.

Thus, for example, the synthesis coefficient illustrated in FIG. 10 may be used. Additionally, the parts in FIG. 10 which corresponds to the parts in FIG. 9 are denoted with the same reference numerals, and the description thereof will be omitted as appropriate.

A broken line CL51 indicates the value of a synthesis coefficient α at each position in the input image in the example illustrated in FIG. 10, and the value of a synthesis coefficient α at each position in the input image is the same as the value of a synthesis ratio D at the same position in this example.

In contrast, a broken line CL52 indicates the value of a synthesis coefficient β at each position in the input image, and the value of a synthesis coefficient β is decided in a manner that the value of the synthesis coefficient β satisfies α+β=1 with the value of a synthesis coefficient α at the same position.

The synthesis unit 64 in a subsequent stage of the synthesis unit 96 also synthesizes the smoothed image L with the input image H on the basis of the synthesis ratio D. In this case, as for the synthesis unit 96, a synthesis coefficient α' and a synthesis coefficient β' decided on the basis of the synthesis ratio D are also used. Specifically, the smoothed image L is multiplied by the synthesis coefficient α', the input image H is multiplied by the synthesis coefficient β', and the images multiplied by these synthesis coefficients are added (synthesized) and used as a captured image M in a synthesis process. That is to say, M=α'L+β'H is satisfied.

For example, the value of the synthesis coefficient α' is the same as the value of the synthesis coefficient α illustrated in FIG. 9 or 10, while the value of the synthesis coefficient β' is also the same as the value of the synthesis coefficient β illustrated in FIG. 9 or 10. Thus, when the captured image M is generated, a contribution ratio of the original input image H is high in a region in which the degradation of image quality due to noise removal easily stands out, and conversely a contribution ratio of the smoothed image L, on which noise removal has been performed, is high in a region in which noise stands out. Accordingly, it is possible to acquire a captured image M that has noise sufficiently removed and has satisfactory image quality.

Additionally, the values of the synthesis coefficient α' and the synthesis coefficient β' may be the same as the values of the synthesis coefficient α and the synthesis coefficient β, or may also be different therefrom. For example, the synthesis coefficient α and the synthesis coefficient β may have the values illustrated in FIG. 9, and the values of the synthesis coefficient α' and the synthesis coefficient β' may be the same as the values of the synthesis coefficient α and the synthesis coefficient β illustrated in FIG. 10.

<Description of Noise Removal Process>

Next, the operation of the noise reduction unit 25 will be described.

When the input image is supplied to the noise reduction unit 24 from the YCC conversion unit 24, the noise reduction unit 25 performs a noise removal process to remove noise from the input image, and outputs a resultant captured image.

Next, a noise removal process performed by the noise reduction unit 25 will be described with reference to the flowchart of FIG. 11. Additionally, a noise removal process described with reference to FIG. 11 corresponds to a noise removal process described with reference to FIG. 2.

In step S41, the color determination unit 51 performs a color determination process on the basis of the input image supplied from the YCC conversion unit 24, calculates an achromatic color degree C in each region of the input image, and supplies the calculated achromatic color degree C to the border region setting unit 52 and the synthesis ratio deciding unit 62. Accordingly, for example, the achromatic color degree C illustrated in FIG. 4 is calculated.

In step S42, the border region setting unit 52 generates border information B on the basis of the achromatic color degree C supplied from the color determination unit 51, and supplies the generated border information B to the connection unit 91. Accordingly, for example, the border information B illustrated in FIG. 4 is acquired.

In step S43, the edge identification unit 61 calculates a luminance feature amount F on the basis of the input image supplied from the YCC conversion unit 24, and supplies the calculated luminance feature amount F to the connection unit 91 and the synthesis ratio deciding unit 62. Accordingly, for example, the luminance feature amount F illustrated in FIG. 5 is acquired.

In step S44, the synthesis ratio deciding unit 62 calculates a synthesis ratio D on the basis of the achromatic color degree C supplied from the color determination unit 51 and the luminance feature amount F supplied from the edge identification unit 61, and supplies the calculated synthesis ratio D to the synthesis unit 96 and the synthesis unit 64. Accordingly, for example, the synthesis ratio D illustrated in FIG. 6 is calculated.

In step S45, the average unit 63 performs an averaging process. Additionally, the detailed averaging process will be described below, but the input image supplied from the YCC conversion unit 24 undergoes a filter process and is averaged (smoothed) in an averaging process on the basis of the border information B, the luminance feature amount F, and the synthesis ratio D, and a resultant smoothed image L is supplied to the synthesis unit 64.

In step S46, the synthesis unit 64 synthesizes the smoothed image L supplied from the average unit 63 with the input image H supplied from the YCC conversion unit 24 on the basis of the synthesis ratio D supplied from the synthesis ratio deciding unit 62, and outputs a resultant captured image M.

Specifically, the synthesis unit 64 decides a synthesis coefficient α' and a synthesis coefficient β' on the basis of the synthesis ratio D, uses those synthesis coefficients to synthesize the smoothed image L with the input image H as the captured image M. When the captured image M is acquired, the noise removal process terminates.

In this way, the noise reduction unit 25 performs a color determination process on the input image and calculates a luminance feature amount, and performs a filter process having appropriate filter strength on the basis of a result of the color determination process and the luminance feature amount. Accordingly, it is possible to prevent image quality from degrading and sufficiently remove noise, so that an image having better image quality can be acquired.

<Description of Averaging Process>

Next, an averaging process corresponding to the process in step S45 of FIG. 11 will be described with reference to the flowchart of FIG. 12.

In step S71, the connection unit 91 exerts connection control over the switch SW1 and the switch SW2 for each process target region of the input image on the basis of the border information B supplied from the border region setting unit 52 and the luminance feature amount F supplied from the edge identification unit 61.

For example, when the luminance feature amount F is greater than or equal to the threshold Th1 and the border information B is also greater than or equal to the threshold Th2, the connection unit 91 causes the switch SW1 to be disconnected and the switch SW2 to be connected. Meanwhile, when the luminance feature amount F is greater than or equal to the threshold Th1 and the border information B is less than the threshold Th2, the connection unit 91 causes the switch SW1 to be connected and the switch SW2 to be disconnected.

Furthermore, when the luminance feature amount F is less than the threshold Th1 and the border information B is greater than or equal to the threshold Th2, the connection unit 91 causes the switch SW1 to be disconnected and the switch SW2 to be connected. When the luminance feature amount F is less than the threshold Th1 and the border information B is also less than the threshold Th2, the connection unit 91 causes both of the switch SW1 and the switch SW2 to be connected.

Accordingly, the input image supplied to the connection unit 91 from the YCC conversion unit 24 is supplied as appropriate to at least any one of the reduction unit 92 and the filter process unit 95 in accordance with connection relationships of the switch SW1 and the switch SW2.

In step S72, the reduction unit 92 reduces the input image supplied from the switch SW1, and supplies the reduced input image to the filter process unit 93.

In step S73, the filter process unit 93 performs a filter process on the input image supplied from the reduction unit 92 by using a smoothing filter, and supplies the input image to the enlargement unit 94.

In step S74, the enlargement unit 94 enlarges the input image supplied from the filter process unit 93 to the original size, and supplies a resultant input image N to the synthesis unit 96.

Additionally, the processes in these steps S72 to S74 are not performed while the switch SW1 is disconnected. In steps S72 to S74, a color difference signal alone is processed in the input image data of the input image, and a luminance signal is not processed.

In step S75, the filter process unit 95 performs a filter process on the input image supplied from the switch SW2 by using a smoothing filter, and supplies a resultant input image O to the synthesis unit 96. In step S75, a filter process is performed on only a color difference signal in the input image data of the input image, and no filter process is performed on a luminance signal. Additionally, the process in step S75 is not performed while the switch SW2 is disconnected.

In step S76, the synthesis unit 96 synthesizes the input image N supplied from the enlargement unit 94 with the input image O supplied from the filter process unit 95 on the basis of the synthesis ratio D supplied from the synthesis ratio deciding unit 62, and supplies a resultant smoothed image L to the synthesis unit 64.

More specifically, when any one of an input image N and an input image O is supplied to the synthesis unit 96, the synthesis unit 96 supplies the supplied input image as a smoothed image L to the synthesis unit 64.

In contrast, when both of an input image N and an input image O are supplied to the synthesis unit 96, the synthesis unit 96 decides a synthesis coefficient α and a synthesis coefficient β on the basis of a synthesis ratio D. The synthesis unit 96 then synthesizes the input image N with the input image O on the basis of the decided synthesis coefficient α and synthesis coefficient β, and supplies a resultant smoothed image L to the synthesis unit 64.

When the smoothed image L is output in this way, the averaging process terminates. Thereafter, the process proceeds to step S46 of FIG. 11. In this way, the average unit 63 changes a filter process performed on the input image and a synthesis ratio in accordance with the border information B and the luminance feature amount F, and generates a smoothed image L. That is to say, different noise removal processes are performed on the input image in accordance with a result obtained by identifying a process target color and a flatness degree of the luminance of the input image.

Accordingly, it is possible to prevent image quality from degrading and sufficiently remove noise, so that an image having better image quality can be acquired.

For example, the border information B is supplied to the filter process unit 93, and the border information B or the like may switch filters used for a filter process on the input image among a plurality of filters included in the filter process unit 93.

In that case, the filter process unit 93 includes, for example, a low-pass filter, an epsilon-filter, and a bilateral filter. The filter process unit 93 then combines any number of filters among those three filters in accordance with the border information B or the like to perform a filter process on the input image. For example, a low-pass filter and an epsilon-filter are used in accordance with the border information B or the like, and a filter process is performed on the input image.

Different combinations of filters are used in this way in accordance with the border information B or the like, so that it is possible to perform a filter process according to a characteristic of a region of the input image such as a region in which resolution degradation is easily perceived, and to acquire an image that has noise sufficiently removed and has better image quality.

<Second Embodiment>

<Regarding Control over Connection of Switch>

Additionally, it has been described so far that the connection unit 91 exerts connection control over the switch SW1 and the switch SW2 on the basis of the border information B and the luminance feature amount F, but any one of the border information B and the luminance feature amount F alone may be used for connection control. For example, when the luminance feature amount F alone is used for connection control, the connection unit 91 of the average unit 63 exerts connection control as illustrated in FIG. 13.

That is to say, when the luminance feature amount F is greater than or equal to the threshold Th1, the connection unit 91 causes both of the switch SW1 and the switch SW2 to be connected.

As discussed above, when the luminance feature amount F is greater than or equal to the threshold Th1, a process target region of the input image is a region having flat luminance to some extent, so that color noise easily stands out and a somewhat high noise removal effect does not cause the degradation of image quality due to resolution degradation to stand out.

Accordingly, when the luminance feature amount F is greater than or equal to the threshold Th1, the connection unit 91 causes the filter process unit 93 and the filter process unit 95 to perform noise removal. This sufficiently removes noise in a filter process (noise removal process) having relatively high filter strength, or a relatively high noise removal effect. As a result, a captured image having better image quality can be acquired.

In contrast, when the luminance feature amount F is less than the threshold Th1, the connection unit 91 causes the switch SW1 to be disconnected and the switch SW2 to be connected. In this case, the connection unit 91 causes the input image to be supplied to the filter process unit 95 alone, and performs noise removal to an extent to which the image quality of the input image does not degrade because a process target region of the input image is a region having non-flat luminance.

<Description of Averaging Process>

Next, a process will be described, the process being performed when the connection unit 91 exerts connection control as illustrated in FIG. 13. In this case, the noise reduction unit 25 performs the noise removal process described with reference to FIG. 11. However, the process in step S42 is not performed in this case.

Figure 11:
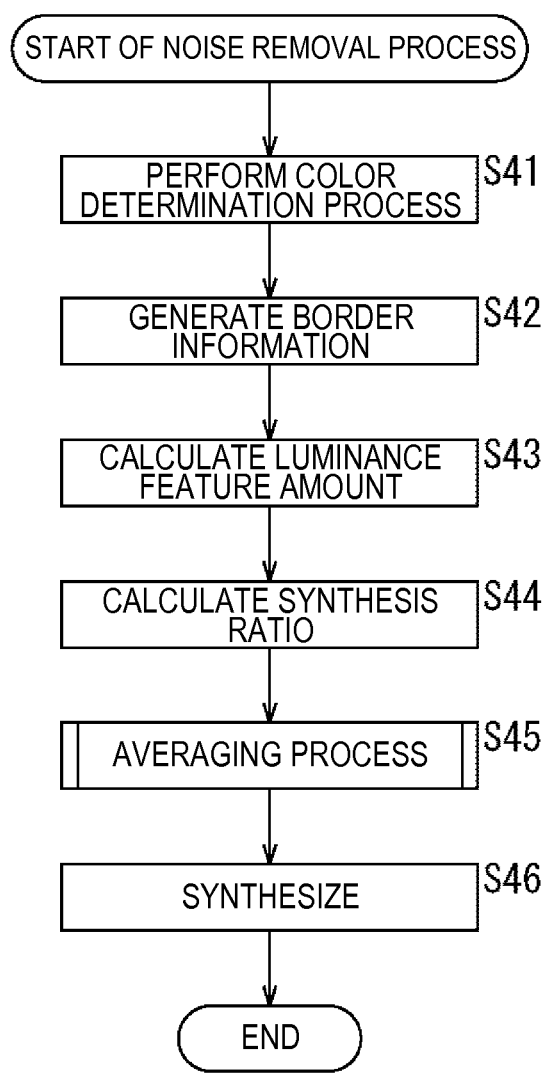
FIG. 11 is a flowchart describing a noise removal process.
Figure 12:
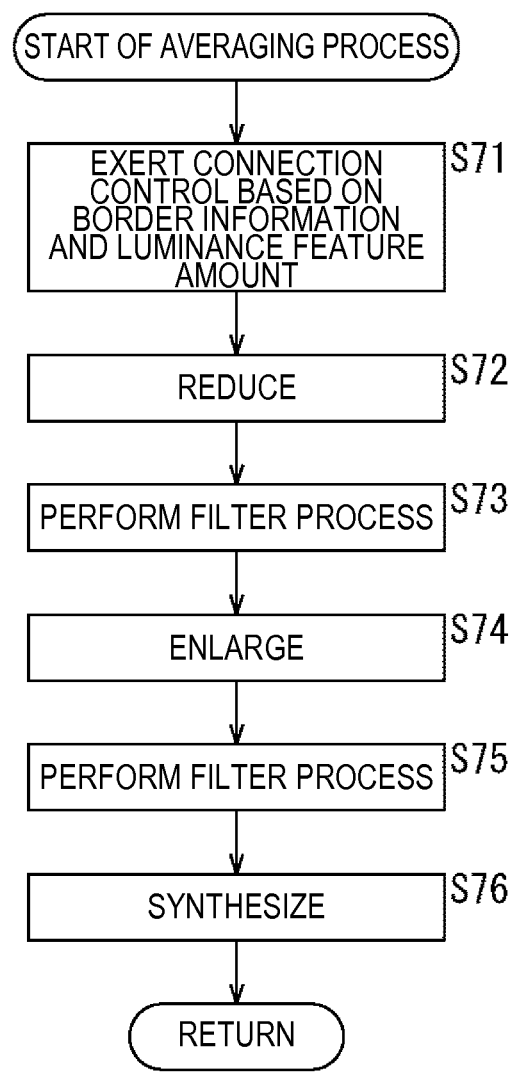
FIG. 12 is a flowchart describing an averaging process.
Figure 14:
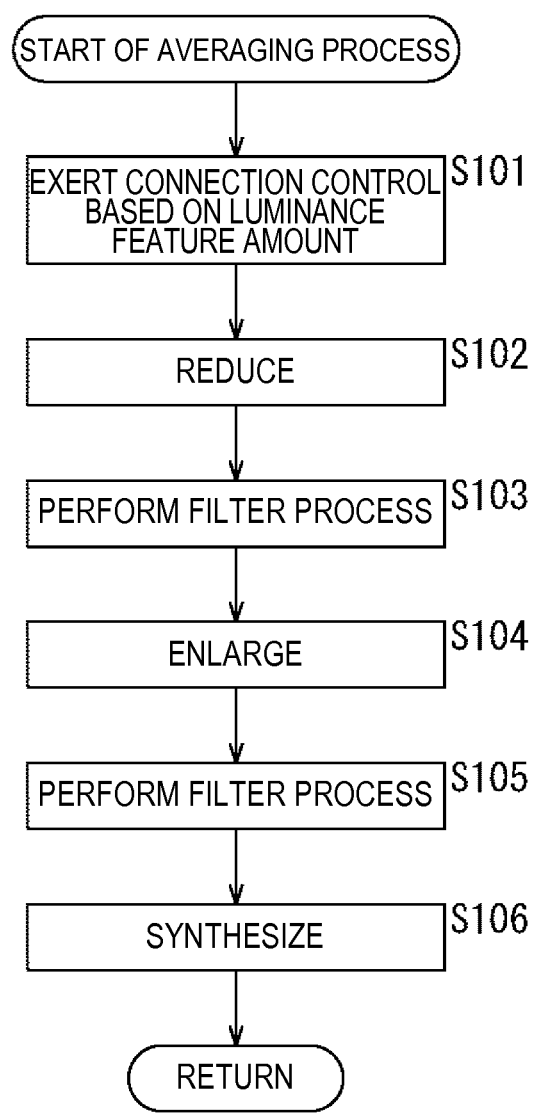
FIG. 14 is a flowchart describing an averaging process.

In addition, for example, the averaging process illustrated in FIG. 14 is performed in the process in step S45 of FIG. 11. An averaging process corresponding to the process in step S45 of FIG. 11 will be described below with reference to the flowchart of FIG. 14.

In step S101, the connection unit 91 exerts connection control over the switch SW1 and the switch SW2 on the basis of the luminance feature amount F supplied from the edge identification unit 61. For example, when the luminance feature amount F is greater than or equal to the threshold Th1, the connection unit 91 causes both of the switch SW1 and the switch SW2 to be connected. When the luminance feature amount F is less than the threshold Th1, the connection unit 91 causes the switch SW1 to be disconnected and the switch SW2 to be connected.

After connection control is exerted over the switches, the processes in steps S102 to S105 are performed. These processes are, however, the same as the processes in steps S72 to S75 of FIG. 12, so that the description thereof will be omitted. However, since the switch SW1 is disconnected when the luminance feature amount F is less than the threshold Th1, the processes in steps S102 to S104 are not performed.

In step S106, the synthesis unit 96 synthesizes the input image N supplied from the enlargement unit 94 with the input image O supplied from the filter process unit 95 on the basis of the synthesis ratio D supplied from the synthesis ratio deciding unit 62, and supplies a resultant smoothed image L to the synthesis unit 64.

More specifically, when the input image O alone is supplied to the synthesis unit 96, the synthesis unit 96 supplies the supplied input image O to the synthesis unit 64 as a smoothed image L.

In contrast, when both of an input image N and an input image O are supplied to the synthesis unit 96, the synthesis unit 96 decides a synthesis coefficient $\alpha$ and a synthesis coefficient $\beta$ on the basis of a synthesis ratio D. The synthesis unit 96 then synthesizes the input image N with the input image O on the basis of the decided synthesis coefficient $\alpha$ and synthesis coefficient $\beta$, and supplies a resultant smoothed image L to the synthesis unit 64.

When the smoothed image L is output in this way, the averaging process terminates. Thereafter, the process proceeds to step S46 of FIG. 11. In this way, the average unit 63 changes a filter process performed on the input image and a synthesis ratio in accordance with the luminance feature amount F or the like, and generates a smoothed image L. That is to say, different noise removal processes are performed on the input image in accordance with a result obtained by identifying a color and a flatness degree of the luminance of a process target region of the input image.

Accordingly, it is possible to prevent image quality from degrading and sufficiently remove noise, so that an image having better image quality can be acquired.

<Third Embodiment>

<Configuration Example of Noise Reduction Unit>

Furthermore, an example has been described so far in which the filter process unit 53 performs noise removal, but another filter process unit may be connected to the filter process unit 53 in series and a multistage noise removal process may be performed.

Figure 15:
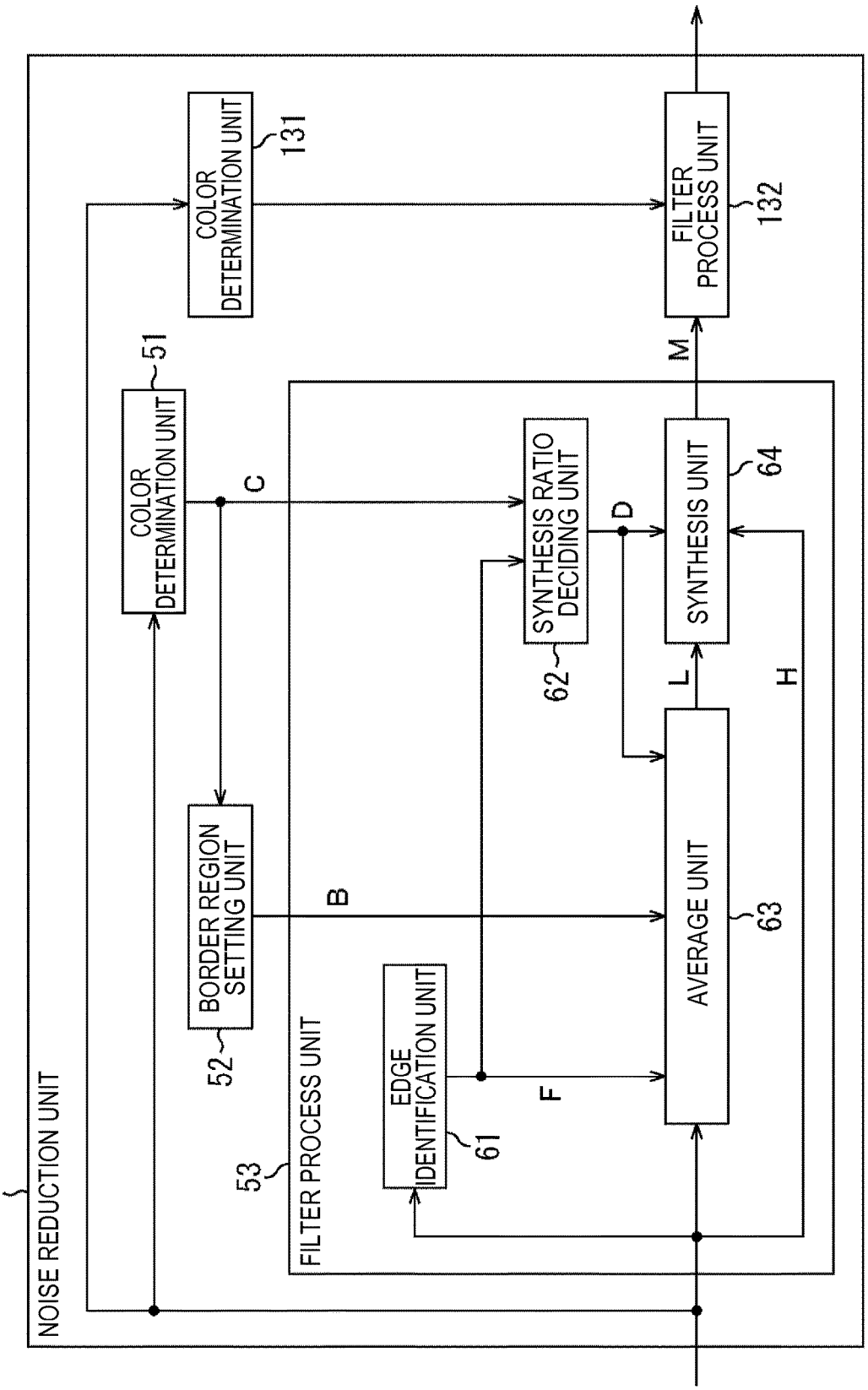
FIG. 15 is a diagram illustrating a configuration example of a noise reduction unit.

In that case, the noise reduction unit 25 is, for example, configured as illustrated in FIG. 15. Additionally, the parts in FIG. 15 which corresponds to the parts in FIG. 3 are denoted with the same reference numerals, and the description thereof will be omitted as appropriate. The noise reduction unit 25 illustrated in FIG. 15 includes a color determination unit 51, a border region setting unit 52, a filter process unit 53, a color determination unit 131, and a filter process unit 132.

The color determination unit 131 calculates a degree of the typicality of a region in a certain color for each region of the input image on the basis of the input image supplied from the YCC conversion unit 24, and supplies the calculated degree of the typicality to the filter process unit 132.

Here, examples of the certain color that is a determination target of the color determination unit 131 specifically include a color such as red, in which color blur is easily perceived or resolution degradation is easily perceived particularly in a border with a region in another color.

The filter process unit 132 performs a filter process on the captured image supplied from the synthesis unit 64 on the basis of the degree of the typicality of a region in a certain color, the degree of the typicality having been supplied from the color determination unit 131, and outputs a resultant image as a final captured image.

For example, the filter process unit 132 performs a noise removal process (filter process) having a relatively low noise removal effect on a border region of the input image between a region in a certain color and a region in another color in order to prevent image quality from degrading because of color blur or resolution degradation. That is to say, a weak noise removal effect is attained in a border between a region in a certain color and a region in another color in a manner that the resolution of the region having the certain color feels unchanged. In addition, a weaker noise removal effect may be attained in a region in a certain color such as a red region than in another region.

To the contrary, the filter process unit 132 performs a noise removal process (filter process) having a relatively high noise removal effect on a region that is not a border in the input image between a region in a certain color and a region in another color to sufficiently remove noise. Additionally, a noise removal effect may be adjusted in accordance with whether the region is a region in a certain color or not.

Furthermore, the filter process unit 132 may synthesize the captured image M with a captured image acquired through a filter process as a final captured image on the basis of a synthesis ratio according to whether a process target region of the input image is a region in a certain color or not. In this case, deciding a contribution ratio of the captured image M for the final captured image as appropriate with regard to a region in a certain color allows the degradation of image quality to be prevented and allows noise to be sufficiently removed.

In this way, the filter process unit 53 is connected to the filter process unit 132 in series, and each of the filter process units performs a filter process according to a region of the input image, so that an image having better image quality can be acquired.

Incidentally, the above-described series of processes may be performed by hardware or may be performed by software. When the series of processes are performed by software, a program forming the software is installed into a computer. Examples of the computer include a computer that is incorporated in dedicated hardware and a general-purpose computer that can perform various types of function by installing various types of program.

Figure 16:
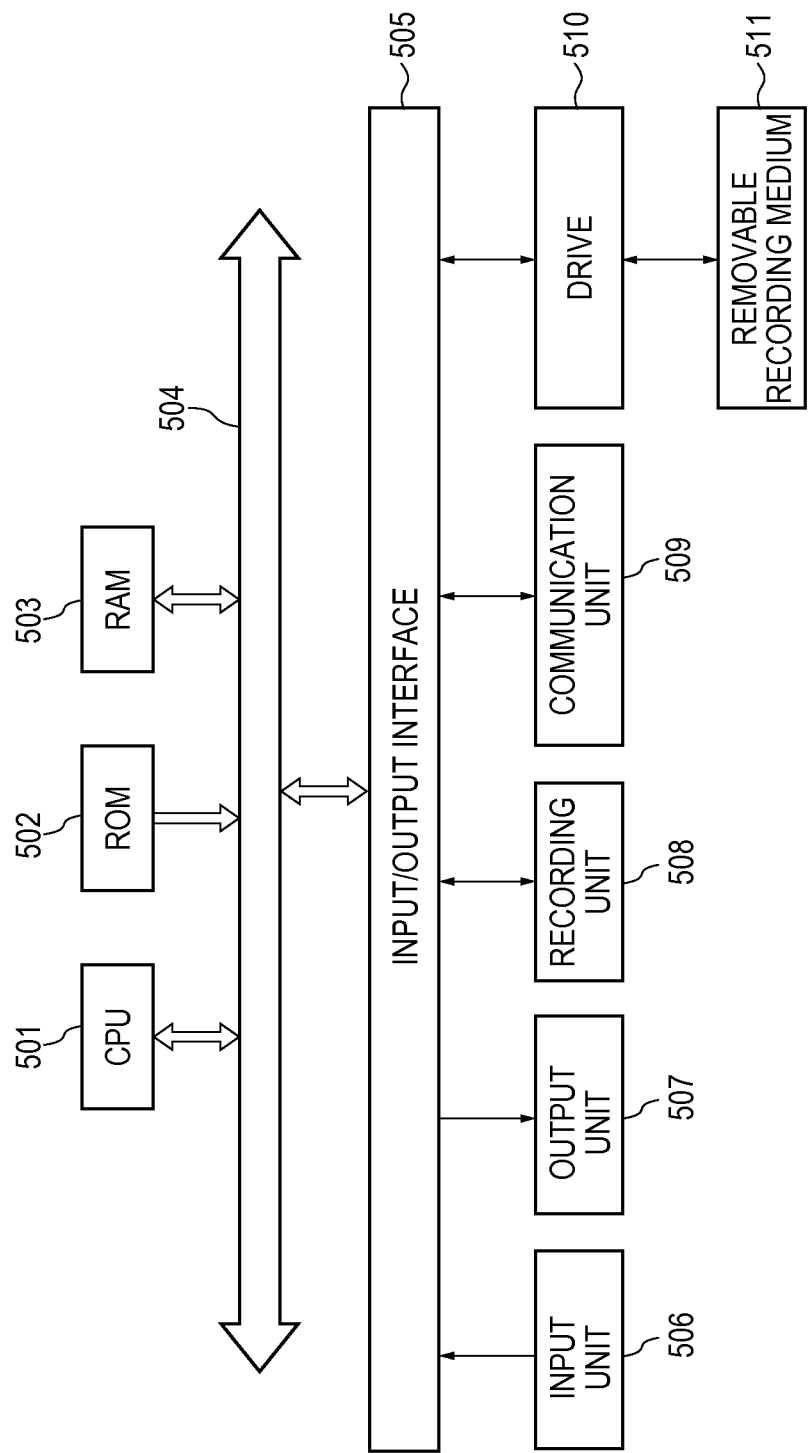
FIG. 16 is a diagram illustrating a configuration example of a computer.

FIG. 16 is a block diagram illustrating a configuration example of the hardware of a computer that performs the above-described series of processes with a program. In the computer, a central processing unit (CPU) 501, read only memory (ROM) 502, and random access memory (RAM) 503 are mutually connected by a bus 504.

Further, an input/output interface 505 is connected to the bus 504. Connected to the input/output interface 505 are an input unit 506, an output unit 507, a recording medium 508, a communication unit 509, and a drive 510. The input unit 506 includes a keyboard, a mouse, a microphone, an image sensor, and the like. The output unit 507 includes a display, a speaker, and the like. The recording unit 508 includes a hard disk, a non-volatile memory, and the like. The communication unit 509 includes a network interface, and the like. The drive 510 drives a removable recording medium 511 such as a magnetic disk, an optical disc, a magneto-optical disk, and a semiconductor memory.

In the computer configured as described above, the CPU 501 loads a program that is recorded, for example, in the recording unit 508 onto the RAM 503 via the input/output interface 505 and the bus 504, and executes the program, thereby performing the above-described series of processes. For example, programs to be executed by the computer (CPU 501) can be recorded and provided in the removable recording medium 511, which is a packaged medium or the like. In addition, programs can be provided via a wired or wireless transmission medium such as a local area network, the Internet, and digital satellite broadcasting.

In the computer, by mounting the removable recording medium 511 onto the drive 510, programs can be installed into the recording unit 508 via the input/output interface 505. Programs can also be received by the communication unit 509 via a wired or wireless transmission medium, and installed into the recording unit 508. In addition, programs can be installed in advance into the ROM 502 or the recording unit 508.

Note that a program executed by the computer may be a program in which processes are chronologically carried out in a time series in the order described herein or may be a program in which processes are carried out in parallel or at necessary timing, such as when the processes are called.

It should be understood by those skilled in the art that various modifications, combinations, sub-combinations and alterations may occur depending on design requirements and other factors insofar as they are within the scope of the appended claims or the equivalents thereof. For example, the present technology can adopt a configuration of cloud computing, in which a plurality of devices share a single function via a network and perform processes in collaboration.

Furthermore, each step in the above-described flowcharts can be executed by a single device or shared and executed by a plurality of devices.

In addition, when a single step includes a plurality of processes, the plurality of processes included in the single step can be executed by a single device or shared and executed by a plurality of devices.

The advantageous effects described herein are not limited, but merely examples. Any other advantageous effects may also be attained.

Additionally, the present technology may also be configured as below.

(1) An image processing device including:
a color determination unit configured to detect a region in a certain color from an input image;
a feature amount calculating unit configured to calculate a feature amount related to luminance of the input image; and
a noise reduction unit configured to perform noise removal on the input image on the basis of a result obtained by detecting the region in the certain color, and the feature amount.

(2) The image processing device according to (1),
wherein the noise reduction unit performs the noise removal having a noise removal effect on the region in the certain color, the noise removal effect being stronger than a noise removal effect of the noise removal to be performed on another region.

(3) The image processing device according to (1) or (2),
wherein the noise reduction unit performs the noise removal having a noise removal effect on a border of the region in the certain color, the noise removal effect being weaker than a noise removal effect of the noise removal to be performed on another region.
(4) The image processing device according to any one of (1) to (3),
wherein the certain color is an achromatic color.
(5) The image processing device according to any one of (1) to (4),
wherein the feature amount calculating unit calculates the feature amount by performing edge detection.
(6) The image processing device according to any one of (1) to (5),
wherein the feature amount calculating unit calculates a flatness degree of luminance as the feature amount.
(7) The image processing device according to (6),
wherein the noise reduction unit performs the noise removal having a noise removal effect on a region, the noise removal effect being stronger than a noise removal effect of the noise removal to be performed on another region, the region having the flatness degree of luminance greater than or equal to a threshold.
(8) The image processing device according to any one of (1) to (7), further including:
a border region setting unit configured to calculate border information indicating typicality of a border of the region in the certain color on the basis of the result obtained by detecting the region in the certain color,
wherein the noise reduction unit performs the noise removal on the input image by performing at least any one of processes different from each other in accordance with the border information and the feature amount.
(9) The image processing device according to (8),
wherein the processes different from each other have different ranges of a region on the input image, the region being used for noise removal.
(10) The image processing device according to (8),
wherein the noise reduction unit includes
a reduction unit configured to reduce the input image,
a first filter process unit configured to perform a filter process on the input image reduced by the reduction unit,
an enlargement unit configured to enlarge the input image on which the first filter process unit has performed the filter process to a size of the input image before reduction by the reduction unit,
a second filter process unit configured to perform a filter process on the input image, and
a connection unit configured to supply the input image to at least any one of the reduction unit and the second filter process unit in accordance with the border information and the feature amount.
(11) The image processing device according to (10),
wherein the noise reduction unit further includes a first synthesis unit configured to synthesize an image acquired through enlargement by the enlargement unit with an image acquired through the filter process by the second filter process unit by using a first synthesizing coefficient decided on the basis of the result obtained by detecting the region in the certain color, and the feature amount.
(12) The image processing device according to (11),
wherein the noise reduction unit further includes a second synthesis unit configured to synthesize an image acquired through synthesis by the first synthesis unit with the input image by using a second synthesis coefficient decided on the basis of the result obtained by detecting the region in the certain color, and the feature amount.
(13) An image processing method including:
detecting a region in a certain color from an input image;
calculating a feature amount related to luminance of the input image; and
performing noise removal on the input image on the basis of a result obtained by detecting the region in the certain color, and the feature amount.
(14) A program for causing a computer to execute the processes of:
detecting a region in a certain color from an input image;
calculating a feature amount related to luminance of the input image; and
performing noise removal on the input image on the basis of a result obtained by detecting the region in the certain color, and the feature amount.

What is claimed is:
1. An image processing device, comprising:
one or more processors configured to:
detect a first region in a certain color from an input image;
calculate a feature amount related to luminance of the input image;
execute noise removal on the input image based on a result obtained by detecting the first region in the certain color, and the feature amount,
reduce the input image;
execute a first filter process on the reduced input image;
enlarge the input image, filtered by use of the first filter process, to a size of the input image before reduction;
execute a second filter process on the input image;
synthesize, the enlarged input image with the input image filtered by use of the second filter process, by use of a first synthesizing coefficient decided based on the result obtained by detection of the first region in the certain color, and the feature amount; and
synthesize, the input image synthesized by use of the first synthesizing coefficient with the input image, by use of a second synthesis coefficient decided based on the result obtained based on detection of the first region in the certain color and the feature amount.
2. The image processing device according to claim 1, wherein the one or more processors are further configured to execute the noise removal having a noise removal effect on the first region in the certain color, the noise removal effect being stronger than a noise removal effect of the noise removal to be executed on a second region.
3. The image processing device according to claim 1, wherein the one or more processors are further configured to execute the noise removal having a noise removal effect on a border of the first region in the certain color, the noise removal effect on the border of the first region being weaker than a noise removal effect of the noise removal to be executed on a second region.
4. The image processing device according to claim 1, wherein the certain color is an achromatic color.
5. The image processing device according to claim 1, wherein the one or more processors are further configured to calculate the feature amount based on edge detection.
6. The image processing device according to claim 5, wherein the one or more processors are further configured to calculate a flatness degree of luminance of the first region as the feature amount, the flatness degree being calculated as a reciprocal of edge strength of the first region.
7. The image processing device according to claim 6, wherein the one or more processors are further configured to execute the noise removal having a noise removal effect on the first region, the noise removal effect being stronger than a noise removal effect of the noise removal to be executed on a second region, the first region having the flatness degree of luminance greater than or equal to a threshold.

8. The image processing device according to claim 1, wherein the one or more processors are further configured to:
   calculate border information indicating typicality of a border of the first region in the certain color based on the result obtained by detecting the first region in the certain color, and
   execute the noise removal on the input image by use of at least any one of processes different from each other based on the border information and the feature amount.

9. The image processing device according to claim 8, wherein the processes different from each other have different ranges of the first region on the input image, the first region being used for noise removal.

10. The image processing device according to claim 8, wherein the one or more processors are further configured to:
    supply the input image for at least one of the reduction or the second filter process based on the border information and the feature amount.

11. An image processing method, comprising:
    detecting a first region in a certain color from an input image;
    calculating a feature amount related to luminance of the input image;
    executing noise removal on the input image based on a result obtained by detecting the first region in the certain color, and the feature amount,
    reducing the input image and executing a first filter process on the reduced input image;
    enlarging the input image, filtered using the first filter process, to a size of the input image before reduction;
    executing a second filter process on the input image;
    synthesizing the enlarged input image with the input image filtered using the second filter process, by using a first synthesizing coefficient decided based on the result obtained by detecting the first region in the certain color, and the feature amount; and
    synthesizing the input image synthesized using the first synthesizing coefficient with the input image, by using a second synthesis coefficient decided based on the result obtained by detecting the first region in the certain color and the feature amount.

12. A non-transitory computer-readable medium having stored thereon, computer-executable instructions for causing a computer to execute operations, comprising:
    detecting a first region in a certain color from an input image;
    calculating a feature amount related to luminance of the input image;
    executing noise removal on the input image based on a result obtained by detecting the first region in the certain color, and the feature amount,
    reducing the input image and executing a first filter process on the reduced input image;
    enlarging the input image, filtered using the first filter process, to a size of the input image before reduction;
    executing a second filter process on the input image;
    synthesizing the enlarged input image with the input image filtered using the second filter process, by using a first synthesizing coefficient decided based on the result obtained by detecting the first region in the certain color, and the feature amount; and
    synthesizing the input image synthesized using the first synthesizing coefficient with the input image, by using a second synthesis coefficient decided based on the result obtained by detecting the first region in the certain color and the feature amount.

* * * * *